(12) United States Patent
Osherovich et al.

(10) Patent No.: US 11,961,303 B1
(45) Date of Patent: Apr. 16, 2024

(54) AGENT RE-VERIFICATION AND RESOLUTION USING IMAGING

(71) Applicant: Amazon Technologies, Inc., Seattle, WA (US)

(72) Inventors: Eli Osherovich, Haifa (IL); Ehud Benyamin Rivlin, Haifa (IL); Yacov Hel-Or, Zichron Yaakov (IL); Dmitri Veikherman, Nesher (IL); Dilip Kumar, Seattle, WA (US); Gerard Guy Medioni, Los Angeles, CA (US); George Leifman, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/738,960

(22) Filed: May 6, 2022

Related U.S. Application Data

(63) Continuation of application No. 15/806,098, filed on Nov. 7, 2017, now Pat. No. 11,328,513.

(51) Int. Cl.
  *G06V 20/52* (2022.01)
  *G06F 18/22* (2023.01)
  (Continued)

(52) U.S. Cl.
  CPC ............ *G06V 20/52* (2022.01); *G06F 18/22* (2023.01); *G06V 10/74* (2022.01); *G06V 10/751* (2022.01);
  (Continued)

(58) Field of Classification Search
  CPC ...... G06V 20/52; G06V 10/74; G06V 10/751; G06V 40/103; G06V 40/166; G06V 40/168; G06V 40/172; G06V 40/23; G06F 18/22
  See application file for complete search history.

(56) References Cited

U.S. PATENT DOCUMENTS

| 6,185,314 B1 | 2/2001 | Crabtree et al. |
|---|---|---|
| 6,263,088 B1 | 7/2001 | Crabtree et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Aaron W Carter
(74) *Attorney, Agent, or Firm* — Athorus, PLLC

(57) ABSTRACT

Described is a multiple-camera system and process for detecting, tracking, and re-verifying agents within a materials handling facility. In one implementation, a plurality of feature vectors may be generated for an agent and maintained as an agent model representative of the agent. When the object being tracked as the agent is to be re-verified, feature vectors representative of the object are generated and stored as a probe agent model. Feature vectors of the probe agent model are compared with corresponding feature vectors of candidate agent models for agents located in the materials handling facility. Based on the similarity scores, the agent may be re-verified, it may be determined that identifiers used for objects tracked as representative of the agents have been flipped, and/or to determine that tracking of the object representing the agent has been dropped.

20 Claims, 15 Drawing Sheets

(51) Int. Cl.
  *G06V 10/74* (2022.01)
  *G06V 10/75* (2022.01)
  *G06V 40/10* (2022.01)
  *G06V 40/16* (2022.01)
  *G06V 40/20* (2022.01)

(52) U.S. Cl.
  CPC .......... *G06V 40/103* (2022.01); *G06V 40/166* (2022.01); *G06V 40/168* (2022.01); *G06V 40/172* (2022.01); *G06V 40/23* (2022.01)

(56) References Cited

U.S. PATENT DOCUMENTS

| | | | |
|---|---|---|---|
| 6,654,047 | B2 | 11/2003 | Iizaka |
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |
| 10,055,853 | B1 | 8/2018 | Fisher et al. |
| 10,134,004 | B1* | 11/2018 | Liberato, Jr. ........ G06Q 10/087 |
| 10,388,019 | B1* | 8/2019 | Hua ........................ G06T 7/50 |
| 10,467,461 | B2 | 11/2019 | Ikeda et al. |
| 10,592,742 | B1 | 3/2020 | Hua et al. |
| 10,789,720 | B1 | 9/2020 | Mirza et al. |
| 10,891,736 | B1* | 1/2021 | Hua ..................... G06V 10/751 |
| 11,328,513 | B1* | 5/2022 | Osherovich .......... G06V 10/751 |
| 11,386,306 | B1* | 7/2022 | Siddiquie ............. G06V 10/774 |
| 2003/0002712 | A1 | 1/2003 | Steenburgh et al. |
| 2004/0153671 | A1* | 8/2004 | Schuyler .................. G07C 9/28 726/9 |
| 2004/0181467 | A1 | 9/2004 | Raiyani et al. |
| 2004/0228503 | A1 | 11/2004 | Cutler |
| 2005/0237196 | A1* | 10/2005 | Matsukawa ........ G08B 21/0269 340/5.2 |
| 2007/0188324 | A1* | 8/2007 | Ballin ................ G06Q 10/0875 340/572.1 |
| 2007/0211938 | A1 | 9/2007 | Tu et al. |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2009/0010490 | A1 | 1/2009 | Wang et al. |
| 2009/0052739 | A1 | 2/2009 | Takahashi et al. |
| 2009/0121017 | A1 | 5/2009 | Cato et al. |
| 2009/0129631 | A1 | 5/2009 | Faure et al. |
| 2009/0245573 | A1 | 10/2009 | Saptharishi et al. |
| 2009/0304229 | A1 | 12/2009 | Hampapur et al. |
| 2009/0324020 | A1 | 12/2009 | Hasebe et al. |
| 2010/0266159 | A1 | 10/2010 | Ueki et al. |
| 2011/0011936 | A1 | 1/2011 | Morandi et al. |
| 2011/0080336 | A1 | 4/2011 | Leyvand et al. |
| 2012/0020518 | A1 | 1/2012 | Taguchi |
| 2012/0026335 | A1 | 2/2012 | Brown et al. |
| 2012/0093364 | A1 | 4/2012 | Sato |
| 2012/0170804 | A1 | 7/2012 | Lin et al. |
| 2012/0281878 | A1 | 11/2012 | Matsuda et al. |
| 2012/0284132 | A1 | 11/2012 | Kim et al. |
| 2012/0307051 | A1 | 12/2012 | Welter |
| 2013/0076898 | A1 | 3/2013 | Philippe et al. |
| 2013/0182114 | A1 | 7/2013 | Zhang et al. |
| 2013/0182905 | A1 | 7/2013 | Myers et al. |
| 2013/0184887 | A1 | 7/2013 | Ainsley et al. |
| 2013/0253700 | A1 | 9/2013 | Carson et al. |
| 2014/0050352 | A1 | 2/2014 | Buehler et al. |
| 2014/0072170 | A1 | 3/2014 | Zhang et al. |
| 2014/0072174 | A1 | 3/2014 | Wedge |
| 2014/0107842 | A1 | 4/2014 | Yoon et al. |
| 2014/0253706 | A1 | 9/2014 | Noone et al. |
| 2014/0279294 | A1 | 9/2014 | Field-Darragh et al. |
| 2014/0328512 | A1 | 11/2014 | Gurwicz et al. |
| 2014/0355825 | A1 | 12/2014 | Kim et al. |
| 2014/0362223 | A1 | 12/2014 | LaCroix et al. |
| 2015/0012396 | A1 | 1/2015 | Puerini et al. |
| 2015/0019391 | A1 | 1/2015 | Kumar et al. |
| 2015/0073907 | A1 | 3/2015 | Purves et al. |
| 2015/0127485 | A1 | 5/2015 | Kakizawa et al. |
| 2015/0146921 | A1 | 5/2015 | Ono et al. |
| 2015/0213328 | A1 | 7/2015 | Mase |
| 2015/0262365 | A1 | 9/2015 | Shimizu |
| 2015/0294183 | A1 | 10/2015 | Watanabe et al. |
| 2015/0345942 | A1 | 12/2015 | Allocco et al. |
| 2016/0110613 | A1 | 4/2016 | Ghanem et al. |
| 2016/0217326 | A1 | 7/2016 | Hosoi |
| 2017/0193772 | A1 | 7/2017 | Kusens et al. |
| 2017/0278254 | A1 | 9/2017 | Ikeda et al. |
| 2017/0308919 | A1 | 10/2017 | Karuvath et al. |
| 2018/0068172 | A1 | 3/2018 | Despiegel et al. |
| 2018/0096209 | A1 | 4/2018 | Matsuda et al. |
| 2018/0247112 | A1 | 8/2018 | Norimatsu |
| 2019/0019016 | A1 | 1/2019 | Ikeda et al. |
| 2019/0104283 | A1 | 4/2019 | Wakeyama et al. |
| 2019/0130718 | A1 | 5/2019 | Alpert |
| 2019/0139229 | A1 | 5/2019 | Ohira et al. |
| 2019/0147251 | A1 | 5/2019 | Numata |
| 2020/0005615 | A1 | 1/2020 | Madden et al. |
| 2020/0193166 | A1* | 6/2020 | Russo .................... G06V 20/52 |
| 2020/0410572 | A1 | 12/2020 | Higa et al. |
| 2021/0027608 | A1* | 1/2021 | Shakedd ................ G08B 21/24 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

US 11,961,303 B1

AGENT RE-VERIFICATION AND RESOLUTION USING IMAGING

PRIORITY CLAIM

This Application is a Continuation of U.S. patent application Ser. No. 15/806,098, filed Nov. 7, 2017, and titled "Agent Re-Verification and Resolution Using Imaging," the content of which are incorporated herein by reference in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

BRIEF DESCRIPTION OF THE DRAWINGS

The detailed description is set forth with reference to the accompanying figures. In the figures, the left-most digit(s) of a reference number identifies the figure in which the reference number appears.

DETAILED DESCRIPTION

Figure 1:
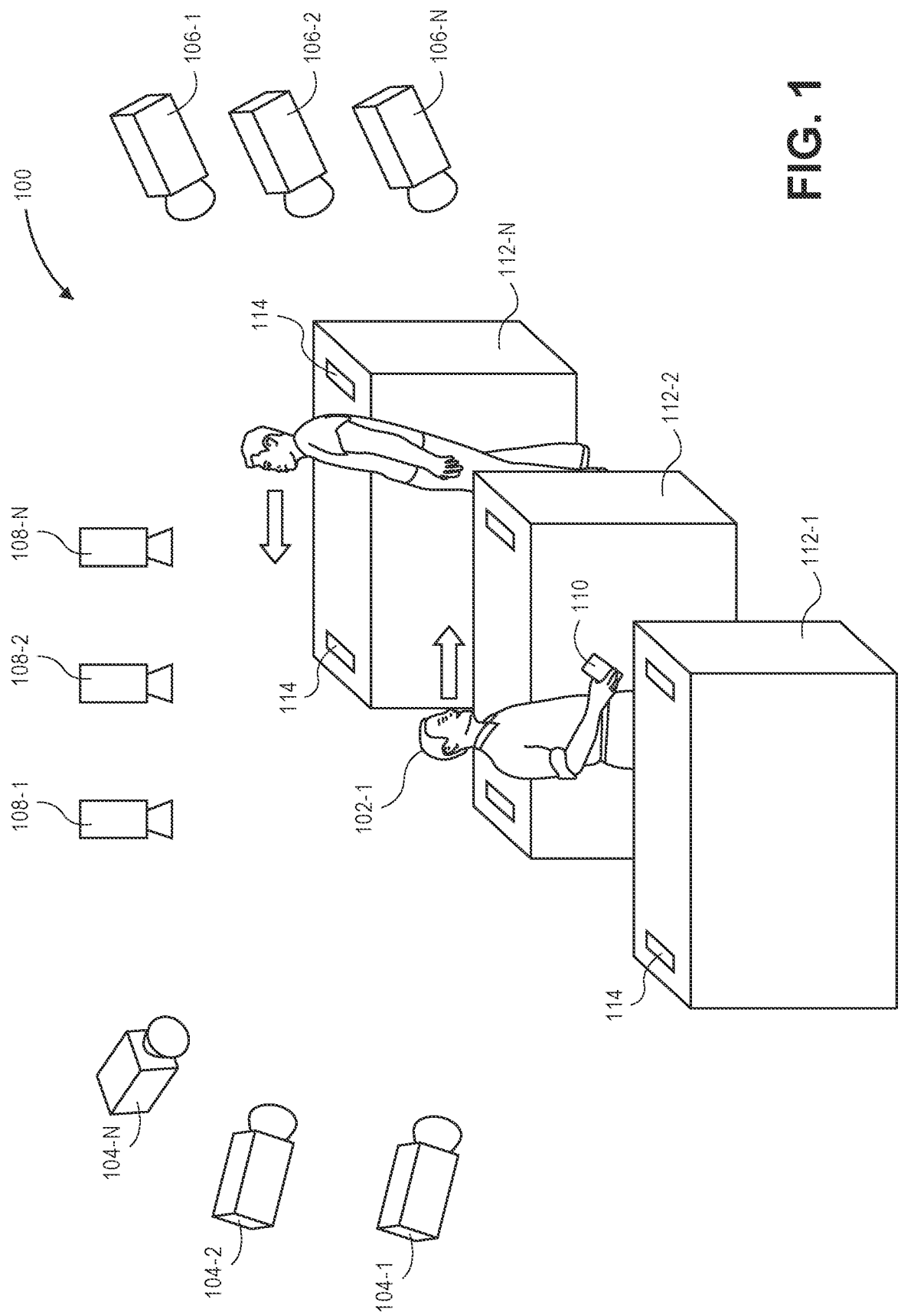
FIG. 1 illustrates an entrance location or exit location within a materials handling facility, in accordance within described implementations.

This disclosure describes a multiple-camera system and process for identifying an agent as the agent enters a materials handling facility and then re-verifying the identity of the agent as they exit the materials handling facility, and/or at any other location within the materials handling facility. In some implementations, multiple images of the agent may be generated from multiple cameras positioned at different angles. The images from the different cameras may then be processed to generate sets of feature vectors that are used to form an agent model representative of the agent. The sets of feature vectors may include face feature vectors representative of a face of the agent, head feature vectors representative of the head of the agent, torso feature vectors representative of a torso of the agent, lower body feature vectors, foot feature vectors, or whole-body feature vectors representative of the whole body of the agent.

Because multiple agents may be located and moving within a materials handling facility at the same time, and often the agents become physically close to one another, automated tracking of the agents within the facility becomes difficult. For example, if an agent moves into a location that is not viewable by an imaging element (e.g., bathroom, under a passageway, etc.), tracking of the agent may become unavailable, referred to herein generally as a drop. A drop may occur when tracking of an agent within the materials handling facility becomes unavailable for longer than a defined period of time (e.g., five seconds). As noted above, a drop may occur when an agent moves into an area that is not within the field of view of an imaging element. Other examples in which a drop may occur is when an agent moves into an area where an imaging element has become inoperable and thus the area is not within the field of view of the imaging element, the agent moves under another object (e.g., table, shelf, passageway, etc.), thereby blocking the cameras view of the agent, etc. As still another example, tracking of an agent may be dropped even though the agent remains in the field of view of an imaging element. For example, if the agent is in a position (e.g., squatting, sitting, laying) such that one or more processing systems do not recognize them as an agent, tracking of the agent may be dropped.

Likewise, in some instances, when two agents become physically close to one another, such as approaching each other and shaking hands or hugging, the system may lose track of which agent is which. As such, there is a potential that tracking of the agents will be switched and the system may begin mistakenly tracking a first agent as a second agent and tracking the second agent as the first agent, referred to generally herein as a flip.

Due to potential drops and flips of agent tracking, it may be desirable to periodically and/or at specific locations, re-verify the identity of objects being tracked as agents. As described further below, at periodic times and/or at any location, additional imaging elements may be used to generate image data of an object being tracked as an agent, referred to herein as a probe agent, and sets of feature vectors may be generated from the image data and used to form a probe agent model corresponding to the probe agent. The feature vectors of the probe agent model may then be compared with the feature vectors of candidate agent models corresponding to each agent located within the materials handling facility to determine similarity scores between the probe agent model and each of the candidate agent models. Based on the similarity scores, it may be determined which agent within the materials handling facility is the probe agent and a determination may be made as to whether a drop or a flip has occurred during a tracking of the object being tracked as the agent. For purposes of this discussion, a probe agent may be any agent for which verification or re-verification is to be performed.

In some implementations, if a flip and/or a drop has occurred, it may be determined when the flip or drop occurred and the system may update the tracking of the agents so that each agent is appropriately tracked. For example, if agents are moving through the materials handling facility performing detectable events, such as picking items or placing items, an item list associated with the agent model or an identifier assigned to the object being tracked as the agent, agent, or the agent model may be updated to include/remove item identifiers in response to those detected events. In such instances, if a tracking error (e.g., drop or flip) has occurred, the incorrect item list may be updated based on a detected event. In such examples, upon re-verification and determination that a tracking error has occurred, additional processing may be performed to detect the occurrence of the error and the item lists associated with the involved agents may be updated to properly reflect the items picked or placed by those agents.

By utilizing image data from multiple imaging elements and generating multiple sets of feature vectors corresponding to different regions of an agent, when re-verification is performed, some or all of those feature vectors may be utilized to re-verify the agent. Accordingly, the implementations increase the dependability of the system by allowing different feature vectors of an agent model to be used to re-verify the agent when other feature vectors are not available. For example, if the agent model generated for an agent when the agent enters the materials handling facility includes a face feature vector set, a head feature vector set, a torso feature vector set, lower body feature vector set, a foot feature vector set, and a whole body feature vector set, when image data is processed to generate a probe agent model, even if the face or head of the probe agent is not visible, other feature vectors (e.g., torso, lower body, foot, whole body) may be used to re-verify and determine the identity of the probe agent.

As an object being tracked as an agent moves through the materials handling facility, images are obtained and processed to track a position of the object and store position information corresponding to the object and/or the agent corresponding to the object. Likewise, the distance between positions of an object being tracked as the agent and direction of travel may be utilized to confirm and update tracking of the object.

Feature vectors may be representative of an appearance of the agent from different perspectives or fields of view of the agent. Generally, the feature vectors may represent any feature or characteristic of the agent that may aid in the tracking or identification of the agent while the agent is located in the materials handling facility. For example, if the agent is wearing a bright yellow shirt, the color of the agent's torso may be determined and stored as a torso feature vector in a feature vector data store. Feature vectors may be periodically obtained and added to the feature vector data store and/or used to form agent models representative of the agent that are stored in the feature vector data store as the agent moves about the materials handling facility.

In some implementations, sets of the feature vectors may be associated with one or more regions of an agent. For example, an agent may be segmented into a head region, a face region, a torso region, a lower body region, a foot region (or feet region) and/or a whole-body region. Sets of feature vectors generated from multiple images from multiple different imaging elements may be generated for each of the different regions, stored in the feature vector data store, and used to form an agent model or probe agent model for an agent. As will be appreciated, feature vectors for each of the regions may correspond to various different fields of view. In some implementations, feature vectors of a set of feature vectors for a region may be associated with a front of the region or a rear of the region, which may be determined based on the orientation and/or direction of travel of the agent. For example, image data may be utilized to generate front head feature vectors representative of a frontal view of the head region of the agent. Likewise, second image data may be utilized to generate rear head feature vectors representative of a rear or back view of the head region of the agent.

Stored agent models representative of agents may be used to reestablish a tracking of the agent within the materials handling facility, detect flips, and/or to re-verify as the agent when the agent is exiting the materials handling facility. For example, if an object being tracked as an agent moves outside of a view of the cameras (e.g., enters a restroom, moves into an area where a camera is inoperable), the tracking of the object may become unavailable (a drop). At some point in time, the agent will be rediscovered or detected when the agent re-enters the field of view of a camera. Because there is no continuity between the dropped object and the newly detected agent, a probe agent model that includes feature vectors corresponding to different regions of the newly detected agent may be generated and compared with previously generated and stored agent models representative of agents located in the materials handling facility, or compared with previously generated and stored agent models determined to have been dropped. Based on a similarity between the probe agent model and the stored agent models, the probe agent model may be matched with an existing agent model, such as a dropped agent model, and the position of the dropped agent may be updated to match the position of the newly discovered probe agent. The object at the position of the newly discovered agent may then be tracked as the original agent. Generally, an agent model, such as a probe agent model is representative of a plurality of features of the agent.

As another example, when two agents move physically close to one another, tracking of those agents when they separate may be inaccurate. For example, identifiers for each agent may be incorrectly switched (a flip). In such an example, feature vectors of one or both agents may be generated after the agents separate, or at exit, and used to form a probe agent model. Similar to a drop, the probe agent model may be compared with stored agent models of other agents within the materials handling facility and/or compared with agent models of the two agents involved in the potential flip. Based on similarity scores determined from the comparisons, the correct agent may be again determined and associated with the tracking of that agent prior to the potential flip event.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. Likewise, as used herein, an agent may be any person, animal, robot, autonomous vehicle or other trackable object located within a materials handling facility.

FIG. 1 illustrates a location 100, which may be an entrance location, an exit location, or any other location within a materials handling facility, in accordance within described implementations. The location includes multiple imaging elements 104, 106, 106 (e.g., cameras) oriented and different angles such that the imaging elements have different fields of view of the location. For example, imaging elements 104-1, 104-2 through 104-N each are positioned overhead and distributed along a first side of an entrance/exit location that includes dividers 112-1, 112-2 through 112-N through which agents 102 pass as the agents enter or exit the materials handling facility. Imaging elements 106-1, 106-2 through 106-N are each positioned overhead and distributed along a second, opposing side of the entrance/exit location 100 that includes dividers 112-1, 112-2 through 112-N through which agents 102 pass as the agents enter or exit the materials handling facility. Imaging elements 108-1, 108-2 through 108-N each are positioned overhead and distributed above the entrance/exit location that includes dividers 112-1, 112-2 through 112-N through which agents 102 pass as the agents enter or exit the materials handling facility.

By distributing the imaging elements 104, 106, 108 at different positions with respect to the entrance/exit location 100, images of agents as they pass through the dividers 112 from different perspectives or field of view may be obtained and used to generate feature vector sets for different regions of the agent. For example, as agent 102-1 enters the materials handling facility and passes through the dividers 112-1 and 112-2, one or more of the imaging elements 104 will generate image data that includes representations of the agent 102-1 from a rear or back view of the agent 102-1. Simultaneously, one or more of the imaging elements 106 will generate image data that includes representations of the agent 102-1 from a front or face-on view of the agent 102-1 and one or more of the imaging elements 108 will generate image data that includes representations of the agent 102-1 from a top-down or overhead view of the agent. Image data from each of the imaging elements 104, 106, 108 may be used to generate different feature vectors representative of the agent 102-1 and some or all of those feature vectors are used to form an agent model representative of the agent 102-1. As will be appreciated, front, rear, and overhead views are provided only as examples. In other implementations, the cameras may be positioned to obtains other and/or additional views from which feature vectors are generated.

For example, image data from one or more of the imaging elements 104 may be used to generate feature vectors from a rear or back perspective representative of the different regions of the agent (e.g. head region, torso region, lower body region, foot region, and/or whole-body region). Because multiple of the imaging elements 104 may generate image data of the agent 102-1 and each of those imaging elements 104 may generate multiple images of the agent as the agent passes through the dividers 112, multiple feature vectors for each of the regions may be formed from the image data generated by the one or more imaging elements 104. For example, if imaging element 104-1 generates fifteen images of a rear view of the agent 102-1 as the agent passes through the dividers 112 and imaging element 104-2 generates fifteen images of a rear view of the agent 102-1 as the agent passes through the dividers, each of those images may be processed, as discussed further below, to generate feature vectors corresponding to different regions of the agent. For example, the image data from the two imaging elements 104-1, 104-2 may be used to generate a total of thirty rear head feature vectors representative of a rear view of the head region of the agent 102-1, thirty rear torso feature vectors representative of a rear view of the torso region of the agent 102-1, thirty lower body feature vectors representative of a rear view of the lower body region of the agent 102-1, thirty foot feature vectors representative of a rear view of the foot region of the agent 102-1, and thirty whole body feature vectors representative of a rear view of the whole body of the agent 102-1. As will be appreciated, additional or fewer imaging elements as well as additional or fewer images may be utilized to generate rear view feature vectors of an agent.

Simultaneously, or approximately simultaneously with the generation of the feature vectors from image data generated by imaging elements 104-1 and 104-2, image data from imaging elements 106-1, 106-2 may be obtained and processed to generate feature vectors representative of different regions of the agent 102-1 from a front or face-on view of the agent 102-1. For example, if imaging element 106-1 generates fifteen images of a front view of the agent 102-1 as the agent passes through the dividers 112 and imaging element 106-2 generates fifteen images of a front view of the agent 102-1 as the agent passes through the dividers, each of those images may be processed, as discussed further below, to generate feature vectors corresponding to different regions of the agent. For example, the image data from the two imaging elements 106-1, 106-2 may be used to generate a total of thirty front head feature vectors representative of a front view of the head region of the agent 102-1, thirty front face feature vectors representative of a view of the face region of the agent 102-1, thirty front torso feature vectors representative of a front view of the torso region of the agent 102-1, thirty lower body feature vectors representative of a front view of the lower body region of the agent 102-1, thirty foot feature vectors representative of a front view of the foot region of the agent 102-1, and thirty whole body feature vectors representative of a front view of the whole body of the agent 102-1. As will be appreciated, additional or fewer imaging elements as well as additional or fewer images may be utilized to generate front view feature vectors of an agent.

Feature vectors may also be generated from image data obtained from overhead imaging elements, such as imaging elements 108-1 and 108-2. Image data from overhead imaging elements 108 may be obtained and processed to generate feature vectors representative of different regions of the agent 102-1 from an overhead view of the agent 102-1. For example, if imaging element 108-1 generates fifteen images of an overhead view of the agent 102-1 as the agent passes through the dividers 112 and imaging element 108-2 generates fifteen images of an overhead view of the agent 102-1 as the agent passes through the dividers, each of those images may be processed, as discussed further below, to generate feature vectors corresponding to different regions of the agent. For example, the image data from the two imaging elements 108-1, 108-2 may be used to generate a total of thirty overhead head feature vectors representative of an overhead view of the head region of the agent 102-1, thirty face feature vectors representative of an overhead view of the face region of the agent 102-1, thirty torso feature vectors representative of an overhead view of the torso region of the agent 102-1, thirty lower body feature vectors representative of an overhead view of the lower body region of the agent 102-1, thirty foot feature vectors representative of an overhead view of the foot region of the agent 102-1, and thirty whole body feature vectors representative of an overhead view of the whole body of the agent 102-1. As will be appreciated, additional or fewer imaging elements as well as additional or fewer images may be utilized to generate overhead view feature vectors of an agent.

The front, rear, and overhead feature vectors generated for the agent 102-1 as the agent passes through the dividers 112 may be associated with the agent and may form an agent model representative of the agent 102-1. In some implementations, other aspects may be determined and associated with the agent and/or the agent model. For example, in some implementations, one or more of the imaging elements 104, 106, 108 may include depth information such that a distance between the imaging element and the agent 102 may be detected and used to determine an approximate height of the agent. In such an example, the determined height of the agent may also be included in the agent model. In still other examples, the image data may be processed to determine a direction of travel of the agent, an orientation of the agent 102, a gait of the agent, a stride of the agent, etc., and such information may be associated with or included in the agent model.

In some implementations, the dividers positioned at an entrance and/or exit location 100 may include one or more scanners 114 that may be used to determine an identity of the agent. For example, as an agent 102 passes between dividers, the agent may scan a portable device 110, and/or other identifier (e.g., barcode, badge, bokode, quick response code (QR code), radio frequency identification (RFID) tag, etc.) that is associated with the agent to provide an identification of the agent.

As the agent model representative of an agent is generated, an identifier, such as the agent identifier detected by the scanner 114, or any other identifier (e.g., random number) may be associated with the agent 102 and used to track the agent as the agent moves throughout the materials handling facility. Likewise, an agent item list may be generated that is used to track items, such as inventory items, that are picked or placed by the agent while the agent is located in the materials handling facility.

Figure 2:
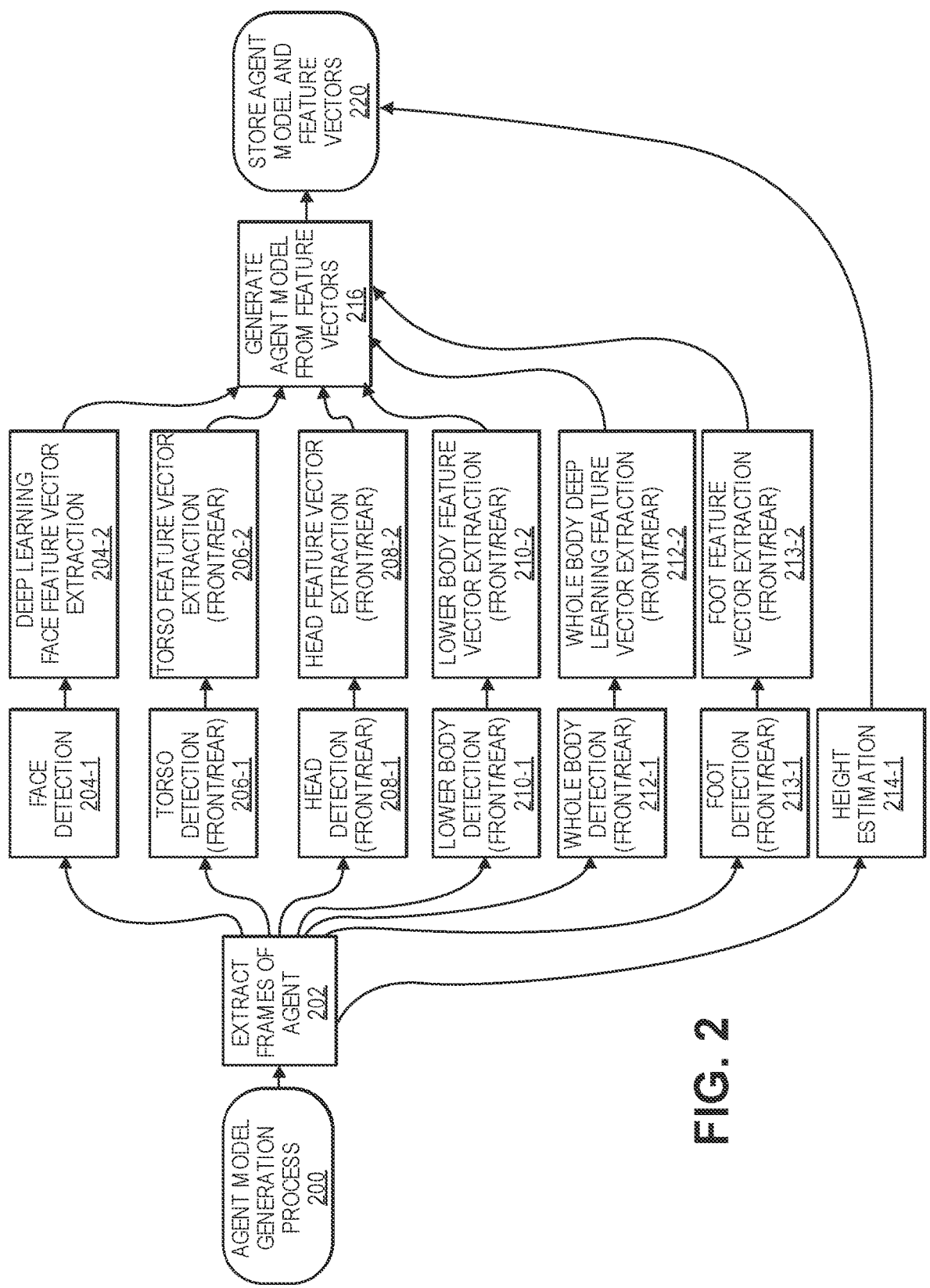
FIG. 2 illustrates an example process for generating an agent model, in accordance with described implementations.

FIG. 2 illustrates an example process 200 for generating an agent model or a probe agent model, in accordance with described implementations. The example process may be performed for each set of image data received from each imaging element (camera) that includes at least a portion of a representation of an agent.

The example process receives image data from an imaging element and extracts frames of images from the image data that include a representation of at least a portion of the agent, as in 202. As discussed herein, frame extraction may use various different algorithms, such as edge detection, object detection, grey scale matching, etc., to detect frames that include a representation of the agent.

Figure 3:
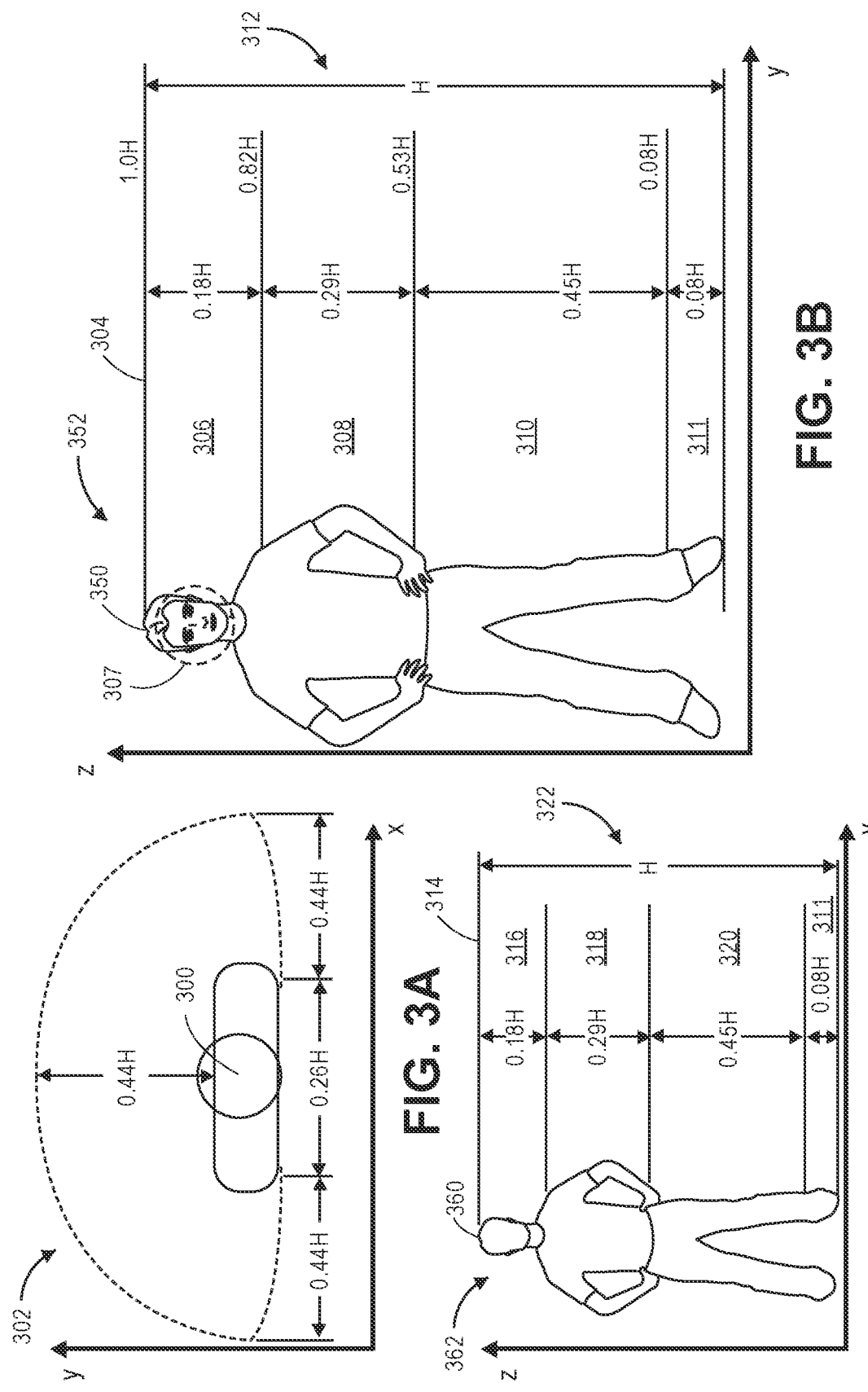
FIG. 3A is an overhead view of an agent model obtained from overhead cameras, in accordance with described implementations.
FIG. 3B is a front view of an agent model obtained from overhead cameras, in accordance with described implementations.
FIG. 3C is a rear view of an agent model obtained from overhead cameras, in accordance with described implementations.

Each frame of extracted image data is then processed to detect one or more corresponding regions of the agent represented in the frame. In this example, processing includes face detection 204-1, front and rear torso detection 206-1, front and rear head detection 208-1, front and rear lower body detection 210-1, front and rear whole-body detection 212-1, front and rear foot detection 213-1, and height estimation 214-1. As discussed with respect to FIGS. 3A-3C, detection of the different regions may be done using depth information and/or various edge and/or object detection processing techniques. For example, FIGS. 3A, 3B and 3C illustrate different views of an agent that may be represented in a frame of image data obtained using the described implementations. Specifically, FIG. 3A is an overhead view 302 of an agent 300 obtained from overhead cameras, such as overhead cameras 108 (FIG. 1), in accordance with described implementations. FIG. 3B is a front view 352 of an agent 350 obtained from overhead cameras, such as cameras 106 (FIG. 1), in accordance with described implementations. FIG. 3C is a rear view 362 of an agent 360 obtained from overhead cameras, such as cameras 104 (FIG. 1), in accordance with described implementations.

The overhead view 302 illustrates the two-dimensional overhead view of the agent with horizontal position information (x, y) of the agent as determined from the image data obtained from the overhead cameras. The front view 352 illustrates a two-dimensional front view showing the depth information (y, z) of the agent 350 above a surface (e.g., floor) of the materials handling facility. The rear view 362 illustrates a two-dimensional rear view showing the depth information (y, z) of the agent 350 above a surface (e.g., floor) of the materials handling facility.

Utilizing the depth information and/or color values of the pixels that represent the agent, a peak height 304/314, or approximate height, of the agent can be determined. For example, an initial classifier may be utilized to identify objects in the received image data. The peak height (highest height of a pixel) of the object may be determined and if the peak height is above a height threshold, it may be determined that the object is an agent. In some implementations, the object may be tracked over a series of frames/images of the image data or for a defined period of time before it is determined whether the object is an agent. In such an example, the movement of the object and/or the average peak height for each object detected in each frame of the image data may be considered in determining whether the object is an agent.

Based on the determined height, regions representative of the agent, such as a head region 306/316, face region 307, torso region 308/318, lower body region 310/320, foot region 311/321, and/or whole-body region 312/322 may be determined. The regions may be independent and/or may overlap with other regions. For example, the torso region 308/318 and the lower body region 310/320 may overlap. As another example, the lower body region 310/320 and the foot region 311/321 may overlap. As still another example, the whole-body region 312/322 overlaps with each of the face region 307, head region 306/316, torso region 308/318, lower body region 310/320, and foot region 311/321.

The regions may be determined based on the shape of the agent represented in the image data, edge detection, object detection, etc. In some implementations, the regions 308/

318 may be determined based on a determined height 304 of the agent. Utilizing anthropometry, the agent can be segmented into different regions corresponding to different segments of the agent. Each region may be defined as a set of image data having coordinates (depth data) between two percentages of the determined approximate height of the agent. For example, referring to FIGS. 3B and 3C, the head region 306/316 may be defined as the set of image data having coordinates between one-hundred percent of the approximate height of the agent and approximately eighty-two percent of the approximate height of the agent. The torso region 308 may be defined as the set of image data having coordinates between approximately eighty-two percent of the approximate height of the agent and approximately fifty-three percent of the approximate height of the agent. The lower body region 310 may be defined as the set of image data having coordinates between approximately fifty-three percent of the approximate height of the agent and approximately eight percent of the approximate height of the agent. The foot region 311 may be defined as the set of image data having coordinates between approximately eight percent of the approximate height of the agent and approximately zero percent of the approximate height of the agent.

The regions may be defined in both the vertical and horizontal components as a percentage of the approximate height of the agent. For example, the torso descriptor region may also be defined as the set of image data having horizontal coordinates that are centered about the approximate peak height of the agent (the center of the head) and approximately thirteen percent of the approximate height of the agent in both directions along the x-axis. Likewise, the set of image data having coordinates along the y-axis may be similarly defined, defined based on a percentage of the approximate height of the agent corresponding to an approximate arm length of the agent (in this example, approximately forty-four percent of the approximate height of the agent), or based on other factors.

In other implementations, the regions may be determined based on edge and/or object detection and corresponding known shapes of different regions. For example, edge detecting may be utilized to determine a head shape of the agent, which may be associated with the head region 306/316. Likewise, the torso and arm shapes may be detected and associated with the torso region 308/318 and the shape of the legs of the agent may be detected and associated with the lower body 310/320 region. Edge detection and/or object detection to determine different shapes of the agent and associate those shapes with different regions may be done with or without the use of depth data information.

Returning to FIG. 2, in addition to determining the regions, the image data may be further processed to determine if the image data for the region corresponds to a front or rear view of the region. Such processing may include image processing to detect features know to be associated with a front view of the agent, such as a face and/or feet oriented forward. Alternatively, or in addition thereto, a series of frames may be compared to determine a direction of movement of the agent and a front orientation may be determined to be in a direction of travel or movement of the agent.

For each defined region, image data representative of the agent is associated with those regions. For each region, the image data is then processed to generate feature vectors representative of that region. For example, one or more deep learning algorithms may be utilized to process image data associated with the face region to extract and generate face feature vectors representative of the agent's face, as in 204-2. Image data associated with the torso region of the agent may be processed to extract and generate torso feature vectors representative of the torso region of the agent, as in 206-2. Image data associated with the head region of the agent may be processed to extract and generate head feature vectors representative of the head of the agent, as in 208-2. Image data associated with the lower body region of the agent may be processed to extract and generate lower body feature vectors representative of the lower body of the agent, as in 210-2. Image data associated with the foot region of the agent may be processed to extract and generate foot feature vectors representative of the feet or a foot of the agent, as in 213-2. In addition, image data representative of the whole body of the agent may be processed to generate feature vectors representative of the whole-body region, as in 212-2.

Feature vectors may be determined for each region and stored in the feature vector data store and collectively used to generate an agent model representative of the agent, as in 216 and 220. Feature vectors generated for each region may indicate, but are not limited to, a height of the region, a shape of the region, a size of the region, a width of the region, a facial feature of the face region, a color histogram representative of a color or colors of the region, such as a color of an item of clothing worn by the agent, a texture of the region, etc. A feature vector representing a color or colors of a region may be determined based on the color values of pixels representing the region and corresponding to that region of the agent. Other descriptors that may be included in the agent pattern include, but are not limited to, a posture of the agent, a pose of the agent, a gait of the agent, a speed of movement of the agent, etc.

While the example illustrated in FIGS. 2 and 3A-3C illustrate a head, face, torso, lower body, foot, and whole-body regions, additional and/or fewer regions may be determined for an agent. For example, other regions may include a left leg region, a right leg region, a left arm region, a right arm region, etc.

Figure 4:
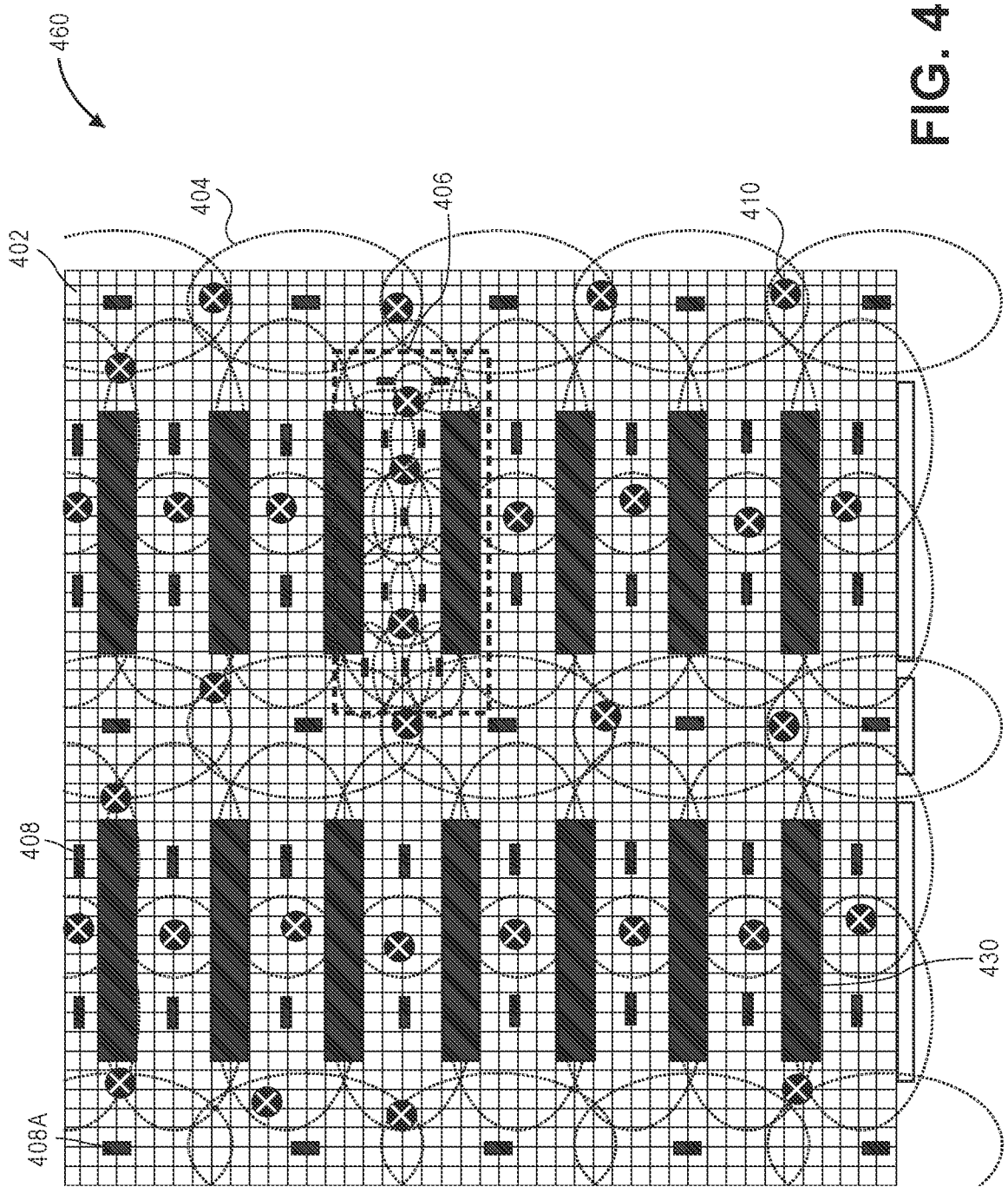
FIG. 4 is a block diagram of an overhead view of a cluster, in accordance with described implementations.

FIG. 4 is a block diagram of an overhead view of a portion or cluster 460 within a materials handling facility, in accordance with described implementations. A cluster may represent a segment of a materials handling facility. In some implementations, a single materials handling facility may include a plurality of clusters. In other implementations, a single cluster may be used to cover an entire materials handling facility.

Within each cluster 460, a plurality of cameras 408 may be positioned overhead (e.g., on a ceiling) at defined locations so that the collective field of view of the cameras covers the entire surface of the portion of the materials handling facility corresponding to the cluster 460. In some implementations, a grid 402 system, physical or virtual, is oriented with the shape of the materials handling facility (e.g., oriented with the walls of the materials handling facility). The grid 402 may be utilized to attach or mount cameras within the cluster 460 at defined locations with respect to the physical space of the materials handling facility. For example, in some implementations, the cameras may be positioned at any one-foot increment from other cameras along the grid.

By mounting the cameras overhead at defined locations along the grid, the cameras can be associated with physical coordinates within the materials handling facility. For example, if the cluster 460 represents the north-west corner of a materials handling facility, the grid 402 may be segmented into columns and rows and cameras may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one-foot increments, the physical location within the materials handling facility of every grid intersection and any connected cameras is known. In this example, camera 408A is positioned at grid coordinate B:3, which corresponds to the horizontal coordinate of the camera being positioned approximately two feet by three feet from the origin (in this example the upper left corner) of the cluster.

Because the field of view 404 of the cameras 408 may not by circular, the cameras may be placed at defined directions (e.g., 0, 90, 180, 270 degrees). The direction of the camera may be determined based on the field of view 404 coverage of adjacent cameras and/or the layout of objects on the surface of the materials handling facility. For example, if the camera 408 is being mounted above an aisle between two inventory locations, the direction or angle of the camera may be set so that the larger portion of the field of view 404 of the camera covers the length of the aisle. As another example, as illustrated in FIG. 1, if the cameras 408 are positioned at an entry or exit location of the materials handling facility, the cameras may be oriented toward the dividers through which the agents pass so that the agent passes through the field of view of the cameras.

The height of the cameras from the surface, the distance between camera placement and/or direction of the cameras 408 within the cluster 460 may vary depending on the layout of the materials handling facility, the lighting conditions in the cluster, the volume of agents expected to pass through a portion of the cluster, the activities and/or volume of activities expected to occur at different locations within the cluster, etc. For example, cameras may typically be mounted horizontally every three to four feet in one direction and every four to five feet in another direction along the grid 402 so that the field of view of each camera overlaps, as illustrated in FIG. 4.

In some implementations, the height of the cameras from the surface and the distance between cameras may be set so that their fields of view intersect and begin to overlap approximately seven feet above the surface of the materials handling facility. Positioning the cameras so that the fields of view overlap at approximately seven feet will result in the majority of agents being within a field of view of a camera at all times. If the field of view of the cameras did not overlap until they were approximately three feet above the surface, as an agent moves between the fields of view, the portion of the agent that is taller than approximately three feet would exit one field of view and not enter the next field of view until the agent has moved into that range of the camera. As such, a portion of the agent is not detectable as they transition between fields of view. Likewise, by overlapping the fields of view of multiple cameras, each of the overlapping cameras may capture images that include representations of the agent from slightly different perspectives. This image data may be combined and utilized to develop a three dimensional, or partially three-dimensional model, feature vectors, and/or utilized to form an agent model and/or probe model.

While this example describes overlapping camera fields of view at approximately seven feet above the surface of the materials handling facility, in other implementations, the cameras may be positioned so that the fields of view begin to overlap at different heights (e.g., six feet, eight feet).

In some areas of the cluster, such as cluster area 406, cameras 408 may be positioned closer together and/or closer to the surface area, thereby reducing their field of view, increasing the amount of field of view overlap, and/or increasing the amount of coverage for the area. Increasing camera density may be desirable in areas where there is a high volume of activity (e.g., item picks, item places, agent dwell time), high traffic areas, high value items, poor lighting conditions, entrances, exits, etc. By increasing the amount of coverage, the image data increases, thereby increasing the likelihood that an activity or action will be properly determined and resulting in additional feature vectors representative of different regions of agents being formed as those agents pass through those areas.

In some implementations, one or more markers 410 may be positioned throughout the cluster and used to aid in alignment of the cameras 408. The markers 410 may be placed at any location within the cluster. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers 410 may be placed on the surface of the materials handling facility. In other implementations, the markers 410 may be placed on a visible surface of an inventory location 430 within the cluster. In still other implementations, the inventory location 430 itself may be utilized as a marker. Alternatively, or in addition thereto, one or more inventory items that are viewable by the cameras may be used as the marker 410. In still other examples, the surface of the materials handling facility may have a detectable pattern, marks, defects, etc., that can be determined and used as markers 410 to align cameras.

In some implementations, the markers 410 may be temporarily placed at locations within the materials handling facility and used to calibrate the cameras. During calibration, the cameras may be aligned with respect to one another by aligning the position of the markers 410 in each camera's field of view. Likewise, the field of view of each camera may be determined and associated with coordinates of the materials handling facility.

Figure 5:
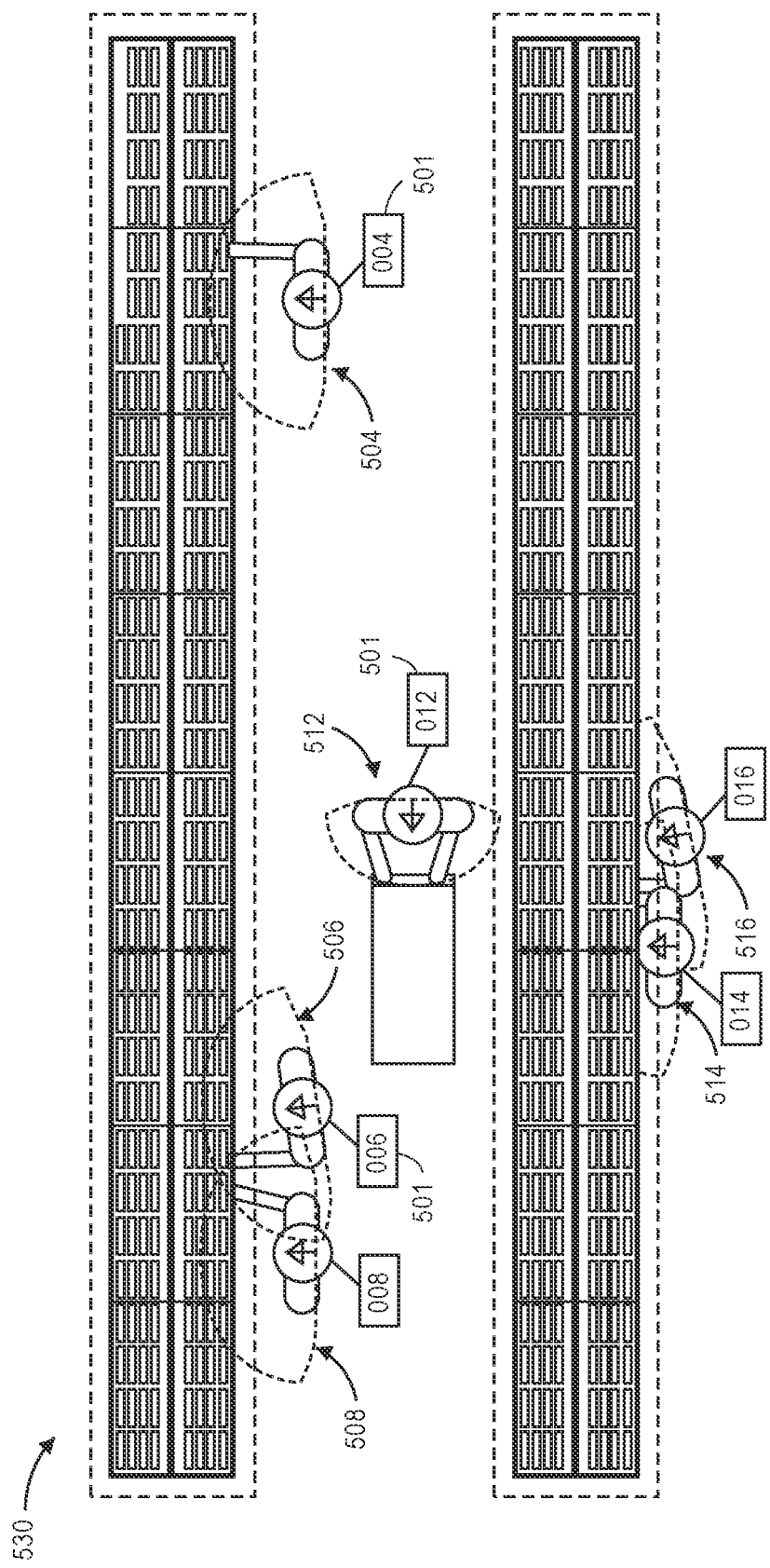
FIG. 5 is an overhead view of an inventory area and a plurality of agent models, in accordance with described implementations.

FIG. 5 is a block diagram of a two-dimensional overhead view of an inventory area 530 and multiple agents 504, 506, 508, 512, 514, 516, in accordance with described implementations. As discussed herein, the agents 504, 506, 508, 512, 514, 516 may be tracked as they move through a materials handling facility by processing image data obtained from cameras located above the inventory area 530. As agents move throughout the materials handling facility, they may interact with items, pick items from inventory locations, place items at inventory locations, move items, and/or perform other events.

During a period of time, such as while an agent is located in a materials handling facility, the agent model representative of features of the agent may be periodically determined from frames of images that include representations of the agent. In addition, an identifier 501, such as a unique identifier, agent identifier, etc., may be associated with each agent and utilized to track the agent as the agent moves throughout the facility. The identifier 501 may be associated with the agent, the agent model, an object being tracked as the agent, and/or the item list associated with the agent/agent model. As the object being tracked as the agent moves about the materials handling facility, image processing is performed to track the movement of the agent and the identifier 501 is updated to correspond to the tracked position of the respective object. In addition, a predicted trajectory or direction of movement of the object being tracked as the agent, based on the tracked positions of the object over the period of time, may also be maintained and associated with the identifier.

In some implementations, it may also be determined whether the position of an object being tracked as an agent is within a defined distance of a position of another object being tracked as another agent. The position may vary for different agents, different locations within the materials handling facility, different lighting conditions, etc. In one implementation, the defined distance is one meter. When agents move within a defined distance of one another, tracking of the agents may become difficult and in some instances the identifiers associated with the agents may be flipped or switched between the objects being tracked as the agents. For example, if agent 514 is six feet four inches tall, weighs two-hundred pounds and is wearing a yellow shirt, and agent 516 is also six feet four inches tall, weighs two-hundred pounds, and is also wearing a white shirt, it may be difficult to distinguish between the two objects being tracked as the agents without considering additional information, such as the agents models and/or feature vectors.

To resolve potential flips of identifiers 501, if it is determined that the position of an agent is within a defined distance of a position of another agent, the identifiers of those agents may be added to a potential flip list. For example, the identifiers "008" and "006" of agents 508 and 506 may be added to a potential flip list, along with a timestamp corresponding to the time during which those agents were within a defined distance of one another. In addition, images of the location that include representations of the agents while within the minimum distance and during the potential flip may be maintained in a data store and accessible for later processing to re-verify the agents.

In the example illustrated in FIG. 5, the identifiers "014" and "106" may also be added to a potential flip list, along with a timestamp corresponding to the time during which those agents were within a defined distance of one another and image data corresponding thereto may be stored in a data store. As discussed further below, a flip list may be utilized to determine potential flip candidate agents, the time and/or location of such potential flips, and to resolve detected flips.

Figure 6:
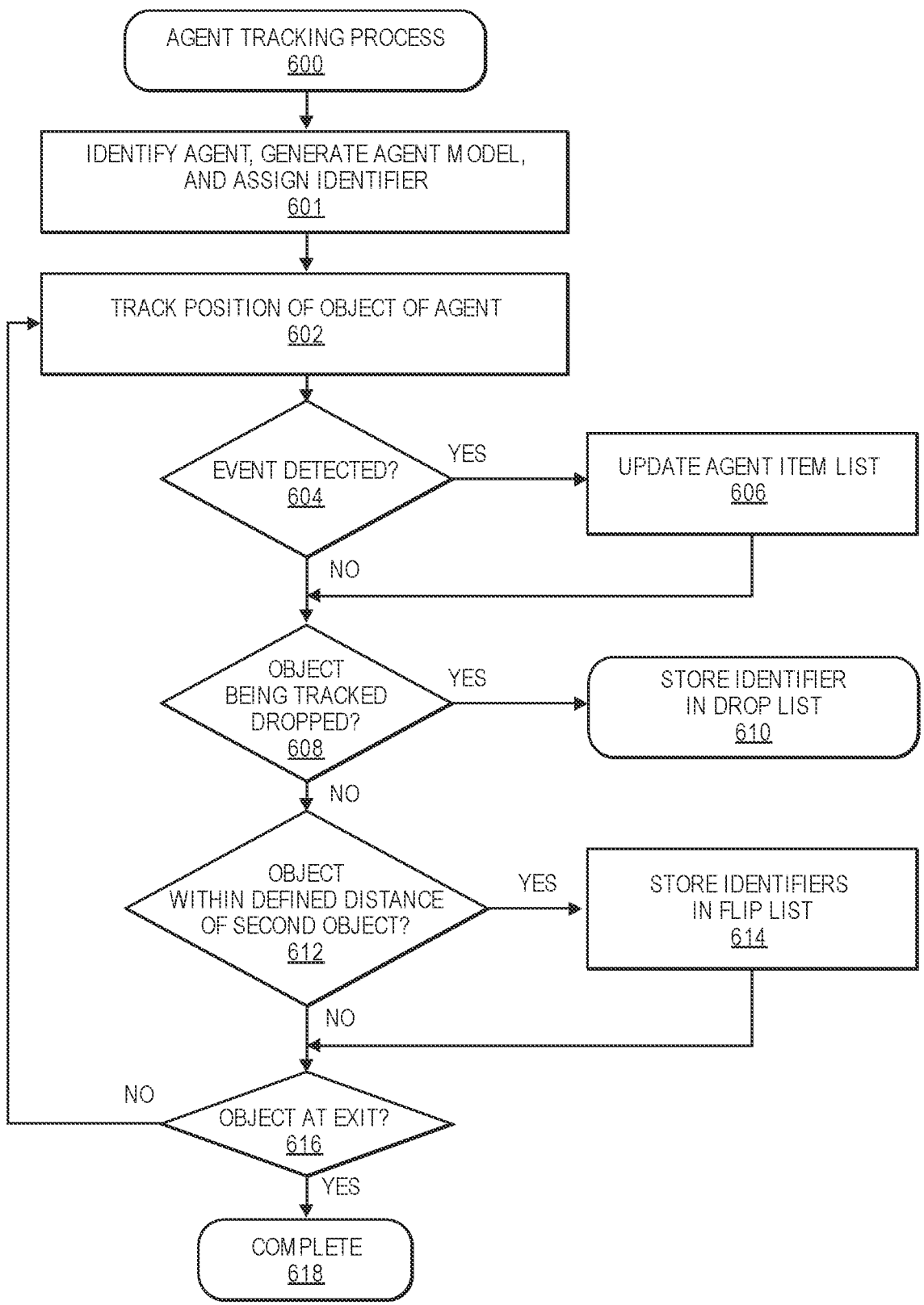
FIG. 6 is a flow diagram of an example agent tracking process, in accordance with described implementations.

FIG. 6 is a flow diagram of an example agent tracking process 600, in accordance with described implementations. The example process 600 begins by identifying the agent, generating an agent model, and assigning an identifier to the object corresponding to the current position of the agent when identified, as in 601. Agent identification and generation of the agent model is discussed above. The identifier may be any unique identifier that is associated with the agent, the object representative of the agent at the position of the agent, and/or the agent model. For example, the identifier may be an agent number associated or assigned to the agent, a randomly generated number that is temporarily assigned to the agent, etc.

Following agent identification, a position of the agent is tracked by tracking an object corresponding to the position of the agent when verified as the object moves about the materials handling facility, as in 602. Position tracking of an object as the agent may include processing of a series of image data to track a movement of the object (agent) represented in the frames of the image data to determine a position or movement of the object between frames. If the position of the object is within a defined limit (e.g., 2 ft. between frames) and in a consistent direction, it can be assumed that the object is the agent and the identifier of the agent may be updated to correspond to the current position of the object. Position tracking, compared to full image processing and identification, provides a low computational cost and quick process for tracking a movement of the agent. In some implementations, position tracking may be performed by comparing pixel color values and/or pixel depth values between adjacent frames to determine respective positions of the same or similar size, shape, color, and/or height object represented in the adjacent frames. In other implementations, other techniques for position tracking known to those skilled in the art of position tracking may be performed.

As the position of the object being tracked as the agent is monitored, a determination is made as to whether an event, such as an item pick, an item place, etc., has been performed that is to be associated with the agent, as in 604. Event detection may be determined by image processing of the image data to determine activities performed by the agent represented in the image. In other implementations, event detection may be determined from other inputs. For example, inventory locations within the materials handling facility may include one or more sensors (e.g., pressure sensors, RFID readers, visual code (barcode, QR code, bokode) readers, etc., that detect picks of items from the inventory location and/or places of items into the inventory location. In such instances, a position of the object being tracked as the agent and location of a detected event by one of those sensors may be utilized to determine whether the agent performed the event. As another example, if the agent is utilizing a tote, the tote may include one or more sensors that detect a placement of an item into or out of the tote. Such information may be another indicator of an event performed by the agent.

If it is determined that an event was performed by the agent, an agent item list associated with the identifier corresponding to the object being tracked as the agent is updated to include an item identifier of the item (in instances of an item pick) or to remove an item identifier corresponding to the item (in the instance of an item place), as in 606.

If it is determined that an event has not occurred, or after updating the agent item list, a determination as to whether the object being tracked as the agent has been dropped, as in 608. As discussed above, an object being tracked as an agent may be dropped if, for example, the agent moves into an area of the materials handling facility that is not covered by cameras, moves into an area with an inoperable camera, maintains a position (e.g., sitting, squatting, laying) that is indicative of a shape of an agent, etc. If it is determined that the object being tracked as the agent has been dropped, the identifier associated with the previously tracked agent is stored in an agent drop list, as in 610, and the example process 600 completes. As discussed further below, the agent drop list may be utilized to reconnect newly detected objects that are believed to be agents with identifiers associated with dropped agents.

If it is determined that the position of the object being tracked as the agent has not been dropped, a determination is made as to whether the object being tracked as the agent has moved within a defined distance of second object that is being tracked as second agent, as in 612. If it is determined that the object being tracked as the agent is within a defined distance of a second object being tracked as a second agent, the identifiers of the two agents, a timestamp, and a location are stored in a flip list indicating a potential flip of identifiers between the two objects that are being tracked as agents, as in 614. As discussed above, when objects being tracked as agents move within a defined distance of one another (e.g., one meter) and then separate, in some instances the identifiers may be incorrectly associated such that the identifier for a first agent gets improperly associated with an object that is really a second agent and the identifier for the second agent gets improperly associated with an object that is really the first agent (i.e., a flip). By maintaining information indicating the potential flip of the identifiers between the objects being tracked for the two agents provides information that may be utilized to resolve the error when the agents corresponding to those tracked objects are re-verified. In some implementations, in addition to adding the identifier to a flip list, a re-verification request may be generated requesting re-verification of the agents associated with the objects being tracked that were potentially flipped.

If it is determined that the object being tracked as the agent has not moved within a defined distance of a second object being tracked as a second agent, or upon adding the identifiers of the agents to a flip list, a determination is made as to whether the object being tracked as the agent is at an exit location, as in 616. If it is determined that the object being tracked as the agent is not at an exit location, the example process returns to block 602 and continues. If it is determined that the object being tracked as the agent is positioned at an exit location, the example process 600 completes, as in 618.

Figure 7:
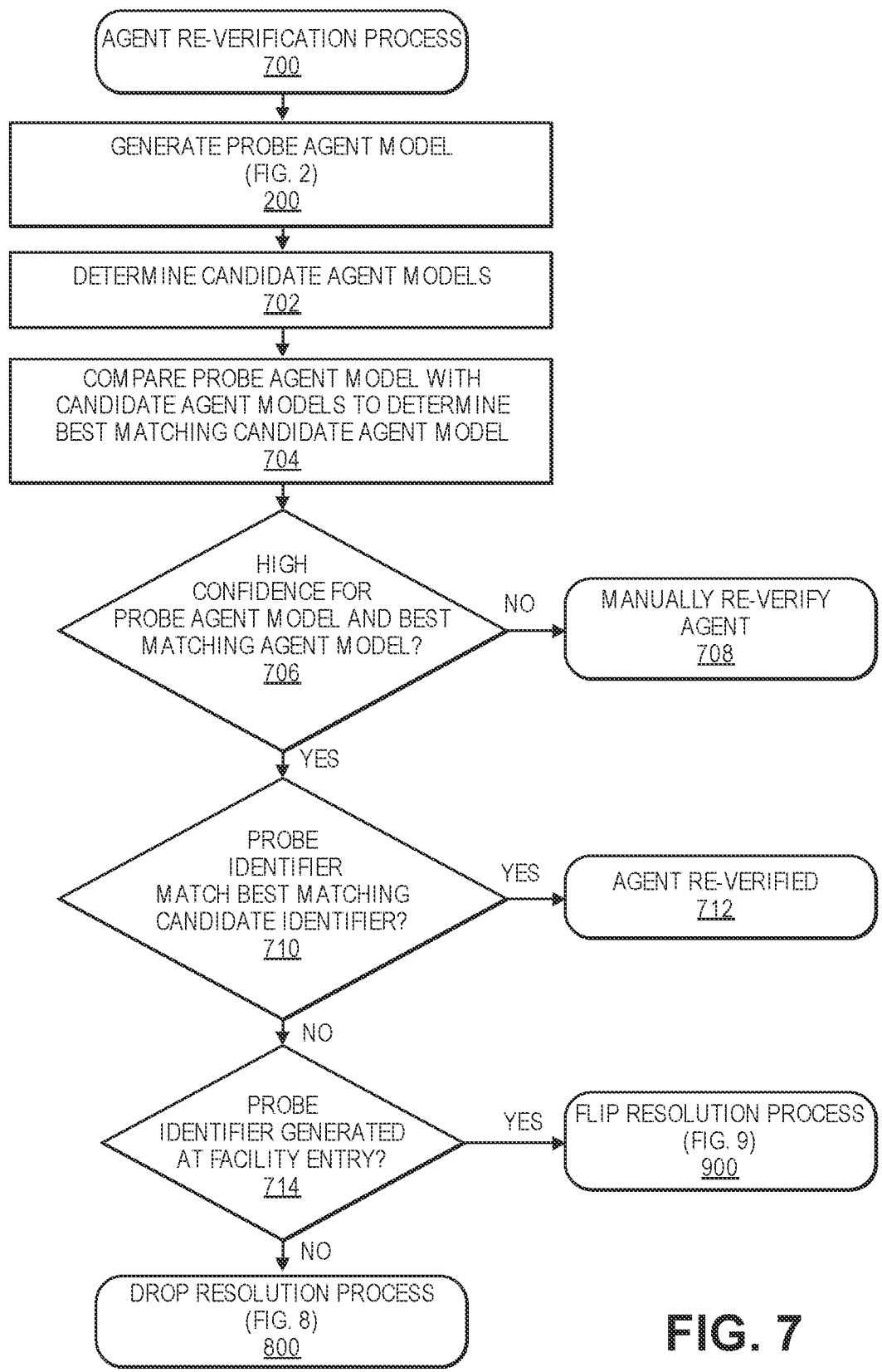
FIG. 7 is a flow diagram of an example agent re-verification process, in accordance with described implementations.

FIG. 7 is a flow diagram of an example agent re-verification process 700, in accordance with described implementations. The example process 700 begins by generating a probe agent model, as in 200. A probe agent model may be generated using the same implementations discussed above for generating an agent model. For example, image data from one or more imaging elements may be received and processed as discussed above with respect to FIGS. 2-3C to generate feature vectors representative of different regions of the probe agent and the probe agent model formed from those feature vectors.

In addition to generating a probe agent model, one or more candidate agent models are determined, as in 702. Candidate agent models may include all agent models generated for agents located in the materials handling facility during a defined period of time. For example, if the probe agent model is for an object being tracked as a first agent, the defined period of time may include the time during which the first agent has been located in the materials handling facility. Any other agents that have been within the materials handling facility during that time, may be determined and agent models for each of those agents may be determined as candidate agent models. In other implementations, the defined period of time may be a defined time window (e.g., prior twenty-four hours) and agent models for any agents located in the materials handling facility during that time may be determined as candidate agent models. In still another example, if the probe agent model is generated for an object tracked as an agent that is identified on a flip list, the candidate agent models may include agent models for agents identified on the flip list. If the probe agent model is generated for an object tracked as an agent that was detected somewhere other than the entrance or exit of a materials handling facility (e.g., initially identified in the middle of the materials handling facility, adjacent an untracked area, etc.), the candidate agent models may include agent models for agents identified on the drop list.

One or more of the feature vectors of the probe agent model are then compared with respective feature vectors of each of the candidate agent models to generate similarity scores and determine a best matching candidate agent model, as in 704. Similarity scores may be determined based on a difference or distance between corresponding feature vectors of the compared agent models. For example, a front torso feature vector of the probe agent model compared to a front feature vector of a candidate agent model will produce a similarity score indicating a similarity between the two feature vectors. Because there are multiple feature vectors for multiple different regions, multiple similarity scores may be generated for each probe agent model and candidate agent model comparison. A similarity score for the comparison may be computed as an average of the similarity scores, a weighted average of the similarity scores, a mean of the similarity scores, a mode of the similarity scores, or otherwise determined. As noted, in some implementations, one or more feature vector similarity scores or similarity scores for regions of feature vectors, such as face feature vectors may be given a higher weighting than similarity scores for other feature vectors when determining a similarity score for the comparison of the probe agent model with the candidate agent model.

A determination may then be made as to whether there is a high confidence that the probe agent model and the best matching candidate agent model represent the same agent, as in 706. A high confidence may require both a similarity score above a defined minimum similarity score and a difference between the similarity score of the best matching candidate agent model and the similarity score of the next best matching candidate agent model being more than a defined minimum difference. For example, the minimum similarity score may be eight-five percent and the defined minimum difference may be more than twenty percent different. In such an example, for there to be a high confidence that the probe agent model and the best matching candidate agent model represent the same agent, the similarity score must be above eight-five percent and the difference between the similarity score of the best matching candidate agent model and the next best matching candidate agent model must be more than twenty percent. For example, if the similarity score of the best matching candidate agent model is ninety-three percent and the similarity score of the next best matching candidate agent model is forty-one percent, it will be determined that there is a high confidence that the probe agent model and the best matching agent model represent the same agent. In comparison, if the similarity score of the best matching candidate agent model is ninety-three percent and the similarity score of the next best matching candidate agent model is eighty-eight percent, it will not be determined that there is a high confidence that the best matching candidate agent model and the probe agent model represent the same agent.

If it is determined that there is not a high confidence, the probe agent is manually re-verified, as in 708, and the example process 700 completes. Manual re-verification may include providing images of the object being tracked and used to generate the feature vectors that formed the probe agent and images of the best matching candidate agent (and possibly images of other candidate agents) to an agent or third-party service to manually compare the images and re-verify an identity of the probe agent.

If it is determined that there is a high confidence that the probe agent model and the best matching candidate agent model represent then same agent, a determination is made as to whether the identifier, referred to herein as a probe identifier, corresponding to the object imaged to form the probe agent model matches the identifier associated with the best matching candidate agent, as in 710. If it is determined that the probe identifier matches the identifier corresponding to the best matching candidate agent model, the agent is re-verified, as in 712, and the example process 700 completes.

If it is determined that that probe identifier does not match the identifier associated with the best matching candidate agent model, a determination is made as to whether the probe identifier was generated at an entrance location of the facility, as in 714. If it is determined that the probe identifier was generated at an entrance to the materials handling facility, it is determined that a flip of identifiers between two or more tracked objects occurred and the example process proceeds to the flip resolution process 900, discussed further below with respect to FIG. 9. If it is determined that the probe identifier was not generated at an entrance to the materials handling facility, it is determined that a drop has occurred and the example process 700 proceeds to a drop resolution process 800, discussed further below with respect to FIG. 8. While the example illustrated in FIG. 7 describes one example for determining between the flip resolution process and the drop resolution process, in other implementations, the determination may be made based on other or additional factors. For example, it may be determined whether the agent represented by the probe identifier has passed within a defined distance of another agent while located in the materials handling facility. If it is determined that the agent represented by the probe identifier has passed within a defined distance of another agent, the flip resolution process (FIG. 9) may be performed. If it is determined that the agent represented by the probe identifier has not passed within a defined distance of another agent, the drop resolution process (FIG. 8) may be performed.

Figure 8:
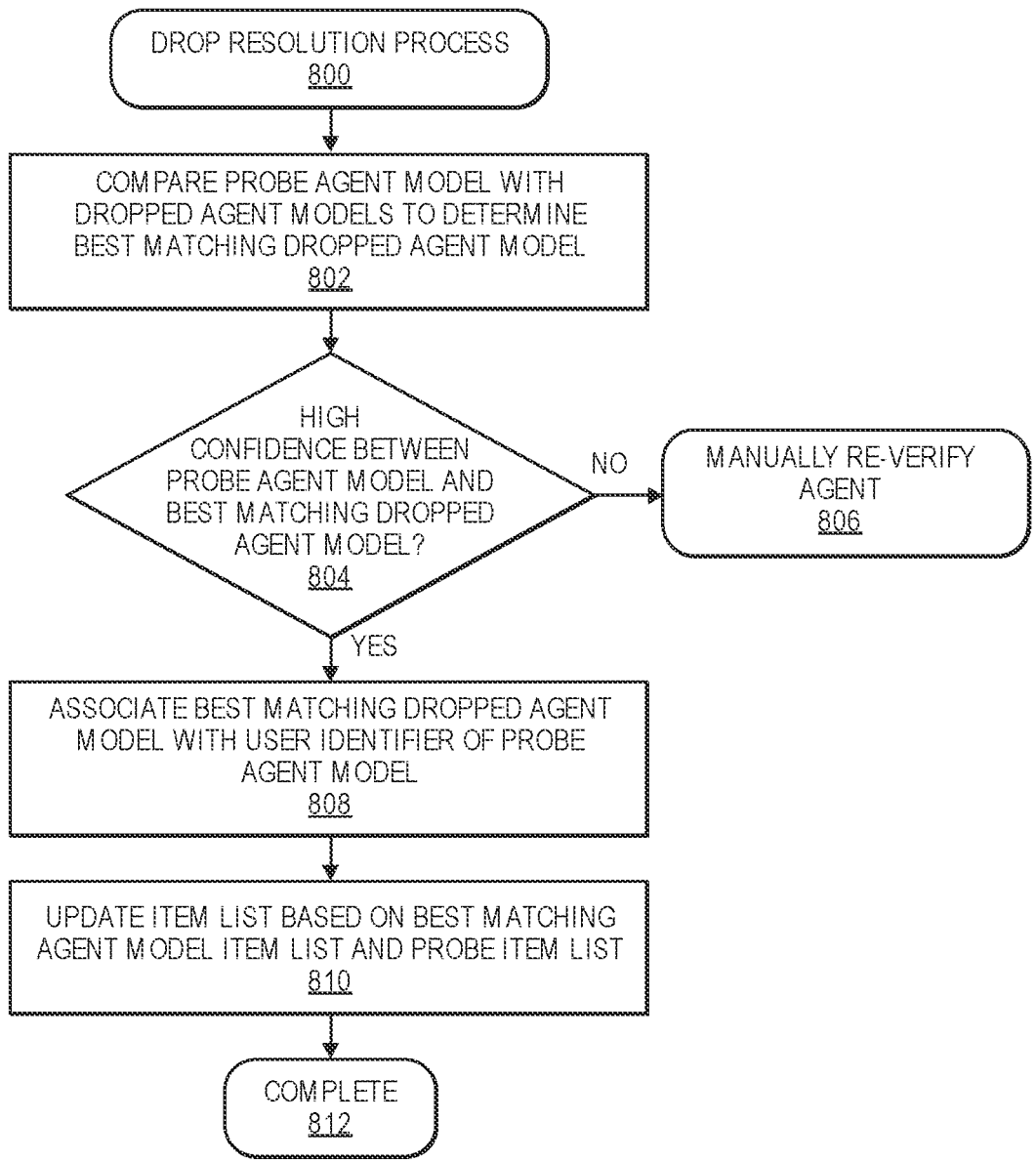
FIG. 8 is a flow diagram of an example drop resolution process, in accordance with described implementations.

FIG. 8 is a flow diagram of an example drop resolution process 800, in accordance with described implementations. The example process begins by comparing one or more feature vectors of the probe agent model with corresponding one or more feature vectors of each dropped agent model, identified on the drop list, to generate a similarity score for each comparison, as in 802. A determination may then be made as to whether there is a high confidence that the probe agent model and the best matching dropped agent model represent the same agent, as in 804. As discussed above, a high confidence may require both a similarity score above a defined minimum similarity score and a difference between the similarity score of the best matching candidate agent model and the similarity score of the next best matching candidate agent model being more than a defined minimum difference.

If it is determined that there is not a high confidence, the probe agent is manually re-verified, as in 806, and the example process 800 completes. Manual re-verification may include providing images of the object being tracked and used to generate the feature vectors that formed the probe agent and images of the best matching drop candidate agent (and possibly images of other candidate agents) to an agent or third-party service to manually compare the images and re-verify an identity of the probe agent.

If it is determined that there is a high confidence that the probe agent model and the best matching dropped agent model represent the same agent, the best matching dropped agent model is associated with the object being tracked and that was used to generate the probe agent model, as in 808. In some implementations, an identifier corresponding to the dropped agent model may be associated with the object being tracked and that was used to generate the probe agent model. In other implementations, an identifier associated with the object being tracked and used to generate the probe agent model may be associated with the agent corresponding to the dropped agent model.

In addition to associating the best matching dropped agent model with the probe agent model, an item list associated with the object that was used to generate the probe agent model and the item list associated with the dropped agent model are combined into a single list as an item list for the re-verified agent, as in 810, and as further discussed below with respect to FIG. 10A. The example process 800 then completes, as in 812.

Figure 9:
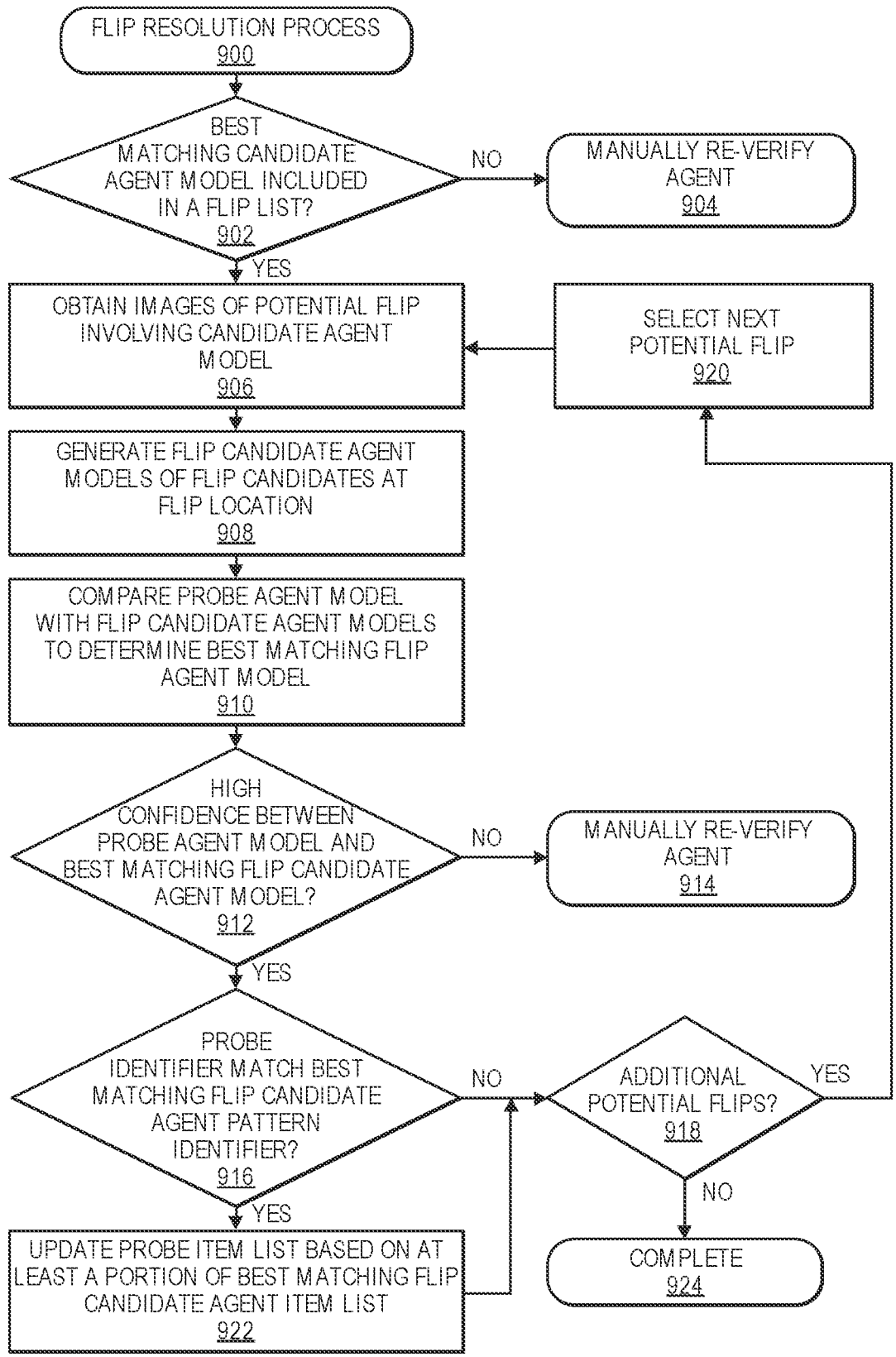
FIG. 9 is a flow diagram of an example flip resolution process, in accordance with described implementations.

FIG. 9 is a flow diagram of an example flip resolution process 900, in accordance with described implementations. The example process 900 begins by determining whether the best matching candidate agent model is included in a flip list, as in 902. If it is determined that the best matching candidate agent model is not included in the flip list, the agent is manually re-verified, as in 904. However, if it is determined that the best matching candidate agent model is included in the flip list, images of the potential flip involving the candidate agent are obtained, as in 906. As discussed above, each time a potential flip is detected, the identifiers of the agents involved in the potential flip, the location, and timestamp corresponding to the potential flip are stored in the flip list. Accordingly, the information from the flip list may be used to obtain images from an image data store that include representations of the potential flip.

Utilizing the obtained images, candidate agent patterns representative of the objects in the obtained images and involved in the flip are generated, as in 908. In some implementations, the obtained images may be processed in a manner similar to that discussed above to determine regions corresponding to each agent and to generate feature vectors for each region of the agent.

Feature vectors of the probe agent model may then be compared with feature vectors generated for each agent involved in the potential flip to determine a similarity score for the comparison, as in 910. A determination may then be made as to whether the probe agent model and the best matching flip candidate agent model represent the same agent, as in 912. As discussed above, a high confidence may require both a similarity score above a defined minimum similarity score and a difference between the similarity score of the best matching flip candidate agent model and the similarity score of the next best matching flip candidate agent model being more than a defined minimum difference.

If it is determined that there is not a high confidence, the probe agent is manually re-verified, as in 914, and the example process 900 completes. Manual re-verification may include providing images of the object being tracked and used to generate the feature vectors that formed the probe agent and images of the best matching candidate flip agent (and possibly images of other candidate agents) to an agent or third-party service to manually compare the images and re-verify an identity of the probe agent.

If it is determined that there is a high confidence that the probe agent model and the best matching flip candidate agent model represent the same agent, a determination is made as to whether the probe identifier and the identifier of the best matching flip candidate agent model match, as in 916. If it is determined that the identifiers match, the probe item list and/or the item list of the best matching flip candidate agent model are updated to include item identifiers from the respective lists and/or to remove item identifiers that correspond to a different agent, as in 922, and as discussed further below with respect to FIG. 10B.

After updating the item list or if it is determined that the probe identifier and the identifier associated with the best matching flip candidate agent model do not match, a determination is made as to whether additional potential flips exist that could relate to the object tracked that was used to generate the probe agent model, as in 918. As illustrated and discussed below with respect to FIG. 10B, an object may be involved in multiple potential flips and each potential flip may be included on the flip list.

If it is determined that additional potential flips do remain that are to be considered by the example process 900, a next potential flip is selected, as in 920. Upon selection of the next potential flip, the example process 900 returns to block 906 and continues by obtaining images relating to that next potential flip. If it is determined that there are no additional potential flips, the example process 900 completes, as in 924.

Figure 10A:
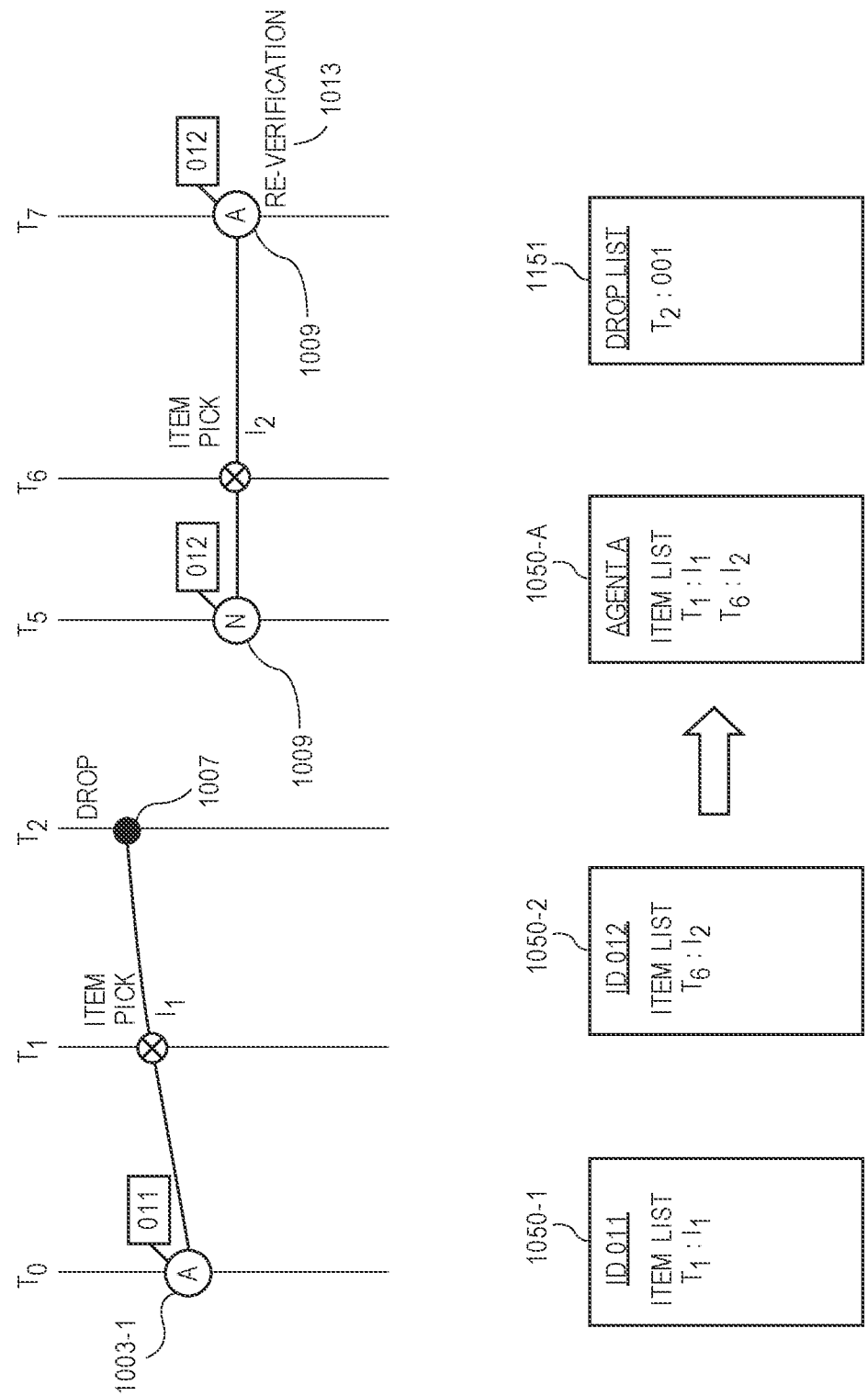
FIG. 10A is an example transition diagram illustrating movement of agents through a materials handling facility during a period of time and a drop, in accordance with described implementations.

FIG. 10A is an example transition diagram illustrating movement of agents through a materials handling facility during a period of time and a drop, in accordance with described implementations. Agent identification, generating of agent models, tracking of objects identified by agents, event detection, etc., as discussed with respect to FIGS. 10A-10C may be performed using image processing and any one or more of the implementations discussed above.

In the illustrated example, at time $T_0$, agent A is verified, an agent model is generated for the agent, and an identifier, "011" is associated with the object 1003-1 to be tracked as the agent moves throughout the materials handling facility. As the agent moves about the materials handling facility, at time $T_1$ an event of an item pick of a first item ($I_1$) is detected near the first object 1003-1 and the agent item list 1050-1 associated with the identifier "011" is updated to include an item identifier $I_1$ and a timestamp $T_1$ corresponding to the event of the item pick of the first item. As discussed above, event detection may be determined based on, for example, one or more of, image processing, input from a sensor, such as a weight change detected by a pressure sensor, etc.

At time $T_2$, tracking of the object 1003-1 becomes unavailable, also referred to herein as a drop 1007. Upon the occurrence of a drop, the time of the drop and identification of the dropped agent may be added to a drop list 1151. For example, the time of the drop may be determined to be a point in time immediately following the last detected time of the object, or the last time of object detection, in this example time $T_1$. Subsequent to the drop 1007, at time $T_5$ a new object 1009 is detected and determined to be an agent, referred to as Agent N. Upon detection, an agent model may be generated for Agent N and an identifier "012" is associated with the object 1009 that is to be tracked as Agent N. Subsequent to detection of the object 1009, at time $T_6$ an event of an item pick of a second item ($I_2$) is detected near the object 1009 and the agent item list 1050-2 associated with the identifier "012" is updated to include an item identifier $I_2$ and a timestamp $T_6$ corresponding to the event of the item pick of the second item.

Finally, at time $T_7$, re-verification 1013 of the agent represented by the object 1009 is performed. As discussed above, a probe agent model representative of the object with identifier "012" at time $T_7$ is generated. In this example, it is determined that Agent N was identified at a location other than an entrance or exit from the materials handling facility. Based at least in part on that determination, the probe agent model is compared to agent models identified on the drop list 1151 and based on a best matching drop candidate agent, it is determined that the agent represented by the probe agent model is Agent A. Accordingly, an agent item list 1050-A for Agent A is updated into include the items identified on item list 1050-1 associated with the identifier 011 and items identified on item list 1050-2 associated with the identifier 012.

Figure 10B:
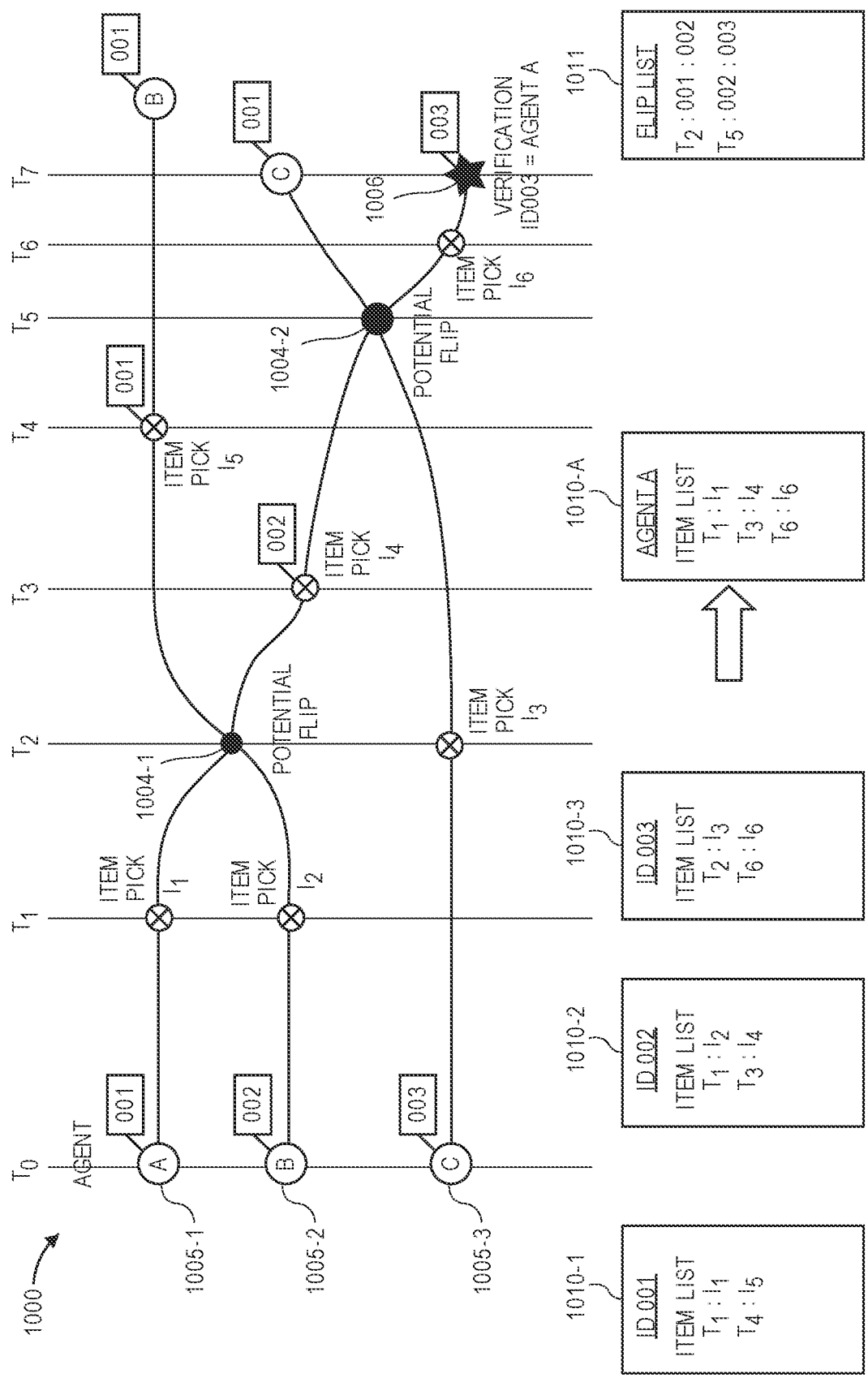
FIG. 10B is an example transition diagram illustrating movement of agents through a materials handling facility during a period of time and potential flips, in accordance with described implementations.

FIG. 10B is an example transition diagram illustrating movement of agents through a materials handling facility 1000 during a period of time and potential flips, in accordance with described implementations. In the illustrated example, at time $T_0$, three agents A, B, and C, are verified, agent models are generated for each of the three agents, and identifiers, "001," "002," and "003" respectively are associated agents and with the objects 1005-1, 1005-2, and 1005-3 to be tracked as the agents move throughout the materials handling facility. As the agents move about the materials handling facility, at time $T_1$ an event of an item pick of a first item ($I_1$) is detected near the first object 1005-1 and the agent item list 1010-1 associated with the identifier "001" is updated to include an item identifier $I_1$ and a timestamp $T_1$ corresponding to the event of the item pick of the first item. Likewise, at time $T_1$ an event of an item pick of a second item ($I_2$) is detected near the second object 1005-2 and the agent item list 1010-2 associated with the identifier "002" is updated to include an item identifier $I_2$ and a timestamp $T_1$ corresponding to the event of the item pick of the second item.

At time $T_2$ it is determined that the object 1005-1 tracked as agent A and the object 1005-2 tracked as agent B are within a defined distance of one another and that a potential flip 1004-1 has occurred. As discussed above, due to the potential flip, the identifiers "001" and "002" corresponding to objects 1005-1 and 1005-2 may be added to a flip list 1011 along with an indication of the location of the potential flip within the materials handling facility. In addition, images of the objects at the location may also be associated and stored in an image data store for further processing, if requested. It is also detected that at time $T_2$ an event of an item pick of a third item $I_3$ is detected near the third object 1005-3 and the agent item list 1010-3 associated with the identifier "003" is updated to include an item identifier $I_3$ and a timestamp $T_2$ corresponding to the event of the item pick of the third item.

At time $T_3$ an event of an item pick of a fourth item ($I_4$) is detected near the object associated with identifier "002." In response to the detected pick event, the agent item lists 1010-2 associated with identifier "002" is updated to include item identifier ($I_4$) and a timestamp $T_3$ corresponding to the event of the item pick of the fourth item. At time $T_4$ an event of an item pick of a fifth item ($I_5$) is detected near the object associated with identifier "001." In response to the detected pick event, the agent item lists 1010-1 associated with identifier "001" is updated to include item identifier ($I_5$) and a timestamp $T_4$ corresponding to the event of the item pick of the fifth item.

At time $T_5$ another potential flip is detected between the objects identified as "002" and "003" and the flip list is updated to include the timestamp $T_5$ and the identifiers "002" and "003" of the objects involved in the potential flip.

At time $T_6$, an event of an item pick of a sixth item ($I_6$) is detected near the object associated with identifier "003." In response to the detected pick event, the agent item list 1010-3 associated with identifier "003" is updated to include item identifier ($I_6$) and a timestamp $T_6$ corresponding to the event of the item pick of the sixth item.

Finally, at time $T_7$, re-verification of the object with the identifier "003" is performed. As discussed above, images of the object are obtained at the time $T_7$ and processed to generate feature vectors corresponding to different segments of the agent that is represented by the object and the feature vectors are used to generate a probe agent model. In this example, it is determined that the identifier "003" associated with the object that is used to form the probe agent model does not correspond to the Agent C that was originally verified and associated with identifier "003." In such an example, further processing may be performed, as discussed above, to determine that the two potential flips 1004-1 and 1004-2 and the probe agent model may be compared to flip candidate agent models indicated on the flip list to determine a best match flip candidate agent model; in this example, the agent model for Agent A. In addition, based on the time of the potential flips, an item list for re-verified agent A may be updated to include the items actually picked by Agent A. In this example, the agent item list 1010-A for agent A is updated to include an item identifier for the first item ($I_1$), which was picked at time one ($T_1$), an item identifier for the fourth item ($I_4$), which was picked at time three ($T_3$), which is after the first potential flip, and an item identifier for the sixth item ($I_6$) which was picked after the second potential flip.

The item list for re-verified agent A may be automatically updated as the actual object corresponding to Agent A is determined at each potential flip. Likewise, the other item lists corresponding to identifiers also involved in the flips may likewise be updated based on the processing of the images.

Figure 10C:
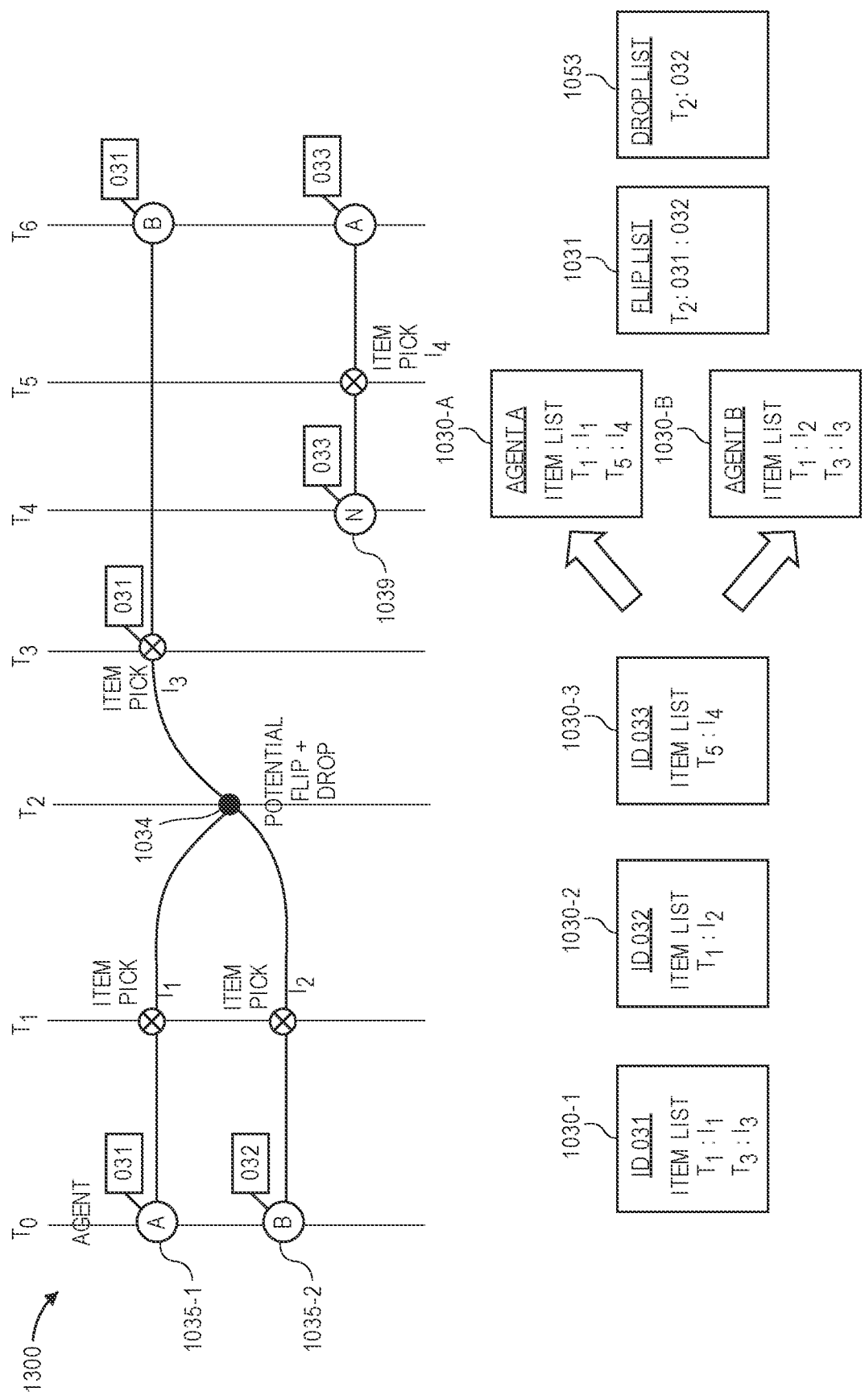
FIG. 10C is an example transition diagram illustrating movement of agents through a materials handling facility during a period of time and a potential flip plus a drop, in accordance with described implementations.

FIG. 10C is another example transition diagram illustrating movement of agents through a materials handling facility 1300 during a period of time and potential flip and drop that occurs at approximately the same time, in accordance with described implementations. In the illustrated example, at time $T_0$, two agents, agent A and agent B, are verified, agent models are generated for both agents, and identifiers, "031" and "032," respectively, are associated with the objects 1035-1 and 1035-2 to be tracked as the agents move throughout the materials handling facility. As the agents move about the materials handling facility, at time $T_1$ an event of an item pick of a first item ($I_1$) is detected near the first object 1035-1 and the agent item list 1030-1 associated with the identifier "031" is updated to include an item identifier $I_1$ and a timestamp $T_1$ corresponding to the event of the item pick of the first item. Likewise, at time $T_1$ an event of an item pick of a second item ($I_2$) is detected near the second object 1035-2 and the agent item list 1030-2 associated with the identifier "032" is updated to include an item identifier $I_2$ and a timestamp $T_1$ corresponding to the event of the item pick of the second item.

At time $T_2$ it is determined that the object 1005-1 tracked as agent A and the object 1005-2 tracked as agent B are within a defined distance of one another and that a potential flip 1034 has occurred. As discussed above, due to the potential flip, the identifiers "031" and "032" corresponding to objects 1035-1 and 1035-2 may be added to a flip list 1031 along with an indication of the location of the potential flip within the materials handling facility. In addition, images of the objects at the location may also be associated and stored in an image data store for further processing, if requested.

It is also determined in this example, that tracking of one of the objects has become unavailable following time $T_2$. Specifically, in the illustrated example, following the potential flip, an object is detected and tracked as object 031, which corresponds to agent A. However, tracking of the second object has become unavailable, also referred to herein as a drop. Upon the occurrence of a drop, the time of the drop and identification of the dropped object may be added to a drop list 1053. In this example, because one of the objects is being tracked with identifier 031 the object added to the drop list is object 032. In other implementations, because both the potential flip and drop occurred at approximately the same time, both identifiers may be added to the drop list 1053.

Subsequent to the potential flip and the drop, at time $T_3$, an event of an item pick of a third item ($I_3$) is detected near the object associated with identifier "031." In response to the detected pick event, the agent item lists 1031-1 associated with identifier "031" is updated to include item identifier ($I_3$) and a timestamp $T_3$ corresponding to the event of the item pick of the third item.

At time $T_4$ a new object 1039 is detected and determined to be an agent, referred to as Agent N. Upon detection, an agent model may be generated for Agent N and an identifier "033" is associated with the object 1039 that is to be tracked as Agent N. Subsequent to detection of the object 1039, at time $T_5$ an event of an item pick of a fourth item ($I_4$) is detected near the object 1039 and the agent item list 1030-3 associated with the identifier "033" is updated to include an item identifier $I_4$ and a timestamp $T_5$ corresponding to the event of the item pick of the fourth item.

Finally, at time $T_6$, re-verification of the agent associated and tracked with identifier 031 is performed. As discussed above, images of the object are obtained at the time $T_6$ and processed to generate feature vectors corresponding to different segments of the agent that is represented by the object and the feature vectors are used to generate a probe agent model. In this example, it is determined that the identifier "031" associated with the object that is used to form the probe agent model does not correspond to the Agent A that was originally verified and associated with identifier "031." In such an example, further processing may be performed, as discussed above, to determine that there was a potential flip and a drop at approximately the same time and the probe agent model may be compared to flip candidate agent models indicated on the flip list to determine a best match flip candidate agent model; in this example, the agent model for Agent B. In addition, the agents identified on the drop list 1053 may also be determined and compared with the probe agent model to determine a best match. Upon comparing the probe agent model with the candidate agent models identified on the flip list 1031 and the drop list 1053, it is determined that a flip occurred such that the object being tracked with identifier 031 actually corresponds to agent B and that the agent for which tracking became unavailable was agent A. Based on this information the object being tracked as agent N may also be reverified and determined to correspond to agent A 1035-1. Based on the time of the potential flip and the drop, an item list for re-verified agent A may be updated to include the items actually picked by Agent A and the item list for re-verified agent B may be updated to include the items actually picked by Agent B. In this example, the agent item list 1030-A for agent A is updated to include an item identifier for the first item ($I_1$), which was picked at time one ($T_1$) and an item identifier for the fourth item ($I_4$), which was picked at time five ($T_5$), which is after the potential flip and drop. Likewise, the agent item list 1030-B for agent B is updated to include an item identifier for the second item ($I_2$), which was also picked at time one ($T_1$), and an item identifier for the third item ($I_3$), which was picked at time three ($T_3$).

Through use of agent models and re-verification of objects by generating probe agent models that are compared with agent models known for agents within the materials handling facility an automated system is provided that enables efficient tracking of agents as they move throughout a materials handling facility. At re-verification of an object being tracked as an agent, if a flip or a drop is determined, the error can be corrected and item lists associated with those agents updated to properly identify items picked and/or placed by the actual agents as those agents moved about the materials handling facility. Such implementations provide a technical improvement over existing systems in numerous manners. First, by generating multiple feature vectors representative of different segments of agents from different views or perspectives and utilizing those feature vectors to form an agent model, some or all of that information may be later used to re-verify the agent. For example, if image data for an object to be re-verified does not include all regions of the object, feature vectors for other regions may be utilized, thereby making the system more robust and reliable. As one example, if image data of a probe agent that is to be used to generate probe feature vectors of a probe agent model does not include a representation of the head and/or face of the probe agent, feature vectors of other regions may be generated and compared with corresponding feature vectors of candidate agent models to re-verify the agent.

Second, because an agent model is generated and maintained in a data store, tracking of an object as the agent may be performed using low computation cost processing to track the position of the object as the object moves about the facility. Even if a flip or drop of the object occurs, at re-verification, as discussed herein, the proper identity of the agent can be determined and an item list updated to properly reflect items to be associated with the agent.

As will be appreciated, many other technical advantages above and beyond those enumerated herein may be realized with the described implementations and those provided are to be considered only as examples.

Figure 11:
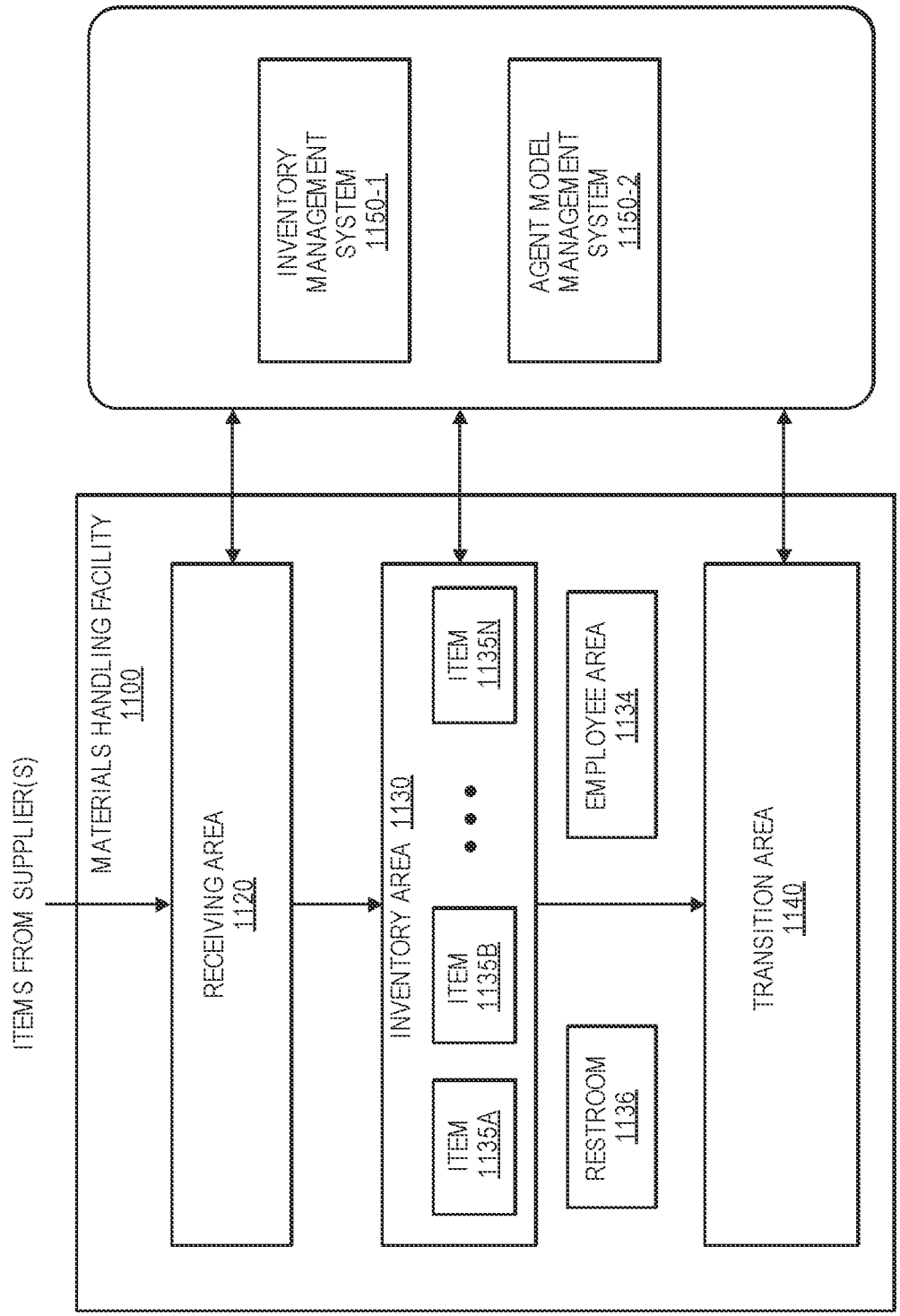
FIG. 11 is a block diagram illustrating a materials handling facility, in accordance with described implementations.

An implementation of a materials handling facility 1100 configured to store and manage inventory items is illustrated in FIG. 11. As shown, a materials handling facility 1100 includes a receiving area 1120, an inventory area 1130 configured to store an arbitrary number of inventory items 1135A, 1135B-1135N, one or more transition areas 1140, one or more restrooms 1136, and one or more employee areas 1134 or break-rooms. The arrangement of the various areas within materials handling facility 1100 is depicted functionally rather than schematically. For example, in some implementations, multiple different receiving areas 1120, inventory areas 1130 and transition areas 1140 may be interspersed rather than segregated. Additionally, the materials handling facility 1100 includes an inventory management system 1150-1 configured to interact with each of receiving area 1120, inventory area 1130, transition area 1140 and/or agents within the materials handling facility 1100. Likewise, the materials handling facility includes an agent model management system 1150-2 configured to interact with image capture devices at each of the receiving area 1120, inventory area 1130, and/or transition area 1140 and to track agents as they move throughout the materials handling facility 1100.

The materials handling facility 1100 may be configured to receive different kinds of inventory items 1135 from various suppliers and to store them until the item is order or retrieved from an inventory location. The general flow of items through the materials handling facility 1100 is indicated using arrows. Specifically, as illustrated in this example, items 1135 may be received from one or more suppliers, such as manufacturers, distributors, wholesalers, etc., at receiving area 1120. In various implementations, items 1135 may include merchandise, commodities, perishables, or any suitable type of item depending on the nature of the enterprise that operates the materials handling facility 1100.

Upon being received from a supplier at receiving area 1120, items 1135 may be prepared for storage. For example, in some implementations, items 1135 may be unpacked or otherwise rearranged and the inventory management system (which, as described below, may include one or more software applications executing on a computer system) may be updated to reflect the type, quantity, condition, cost, location or any other suitable parameters with respect to newly received items 1135. It is noted that items 1135 may be stocked, managed or dispensed in terms of countable, individual units or multiples of units, such as packages, cartons, crates, pallets or other suitable aggregations. Alternatively, some items 1135, such as bulk products, commodities, etc., may be stored in continuous or arbitrarily divisible amounts that may not be inherently organized into countable units. Such items 1135 may be managed in terms of measurable quantities such as units of length, area, volume, weight, time duration or other dimensional properties characterized by units of measurement. Generally speaking, a quantity of an item 1135 may refer to either a countable number of individual or aggregate units of an item 1135 or a measurable amount of an item 1135, as appropriate.

After arriving through receiving area 1120, items 1135 may be stored within inventory area 1130 on an inventory shelf. In some implementations, like items 1135 may be stored or displayed together in bins, on shelves or via other suitable storage mechanisms, such that all items 1135 of a given kind are stored in one location. In other implementations, like items 1135 may be stored in different locations. For example, to optimize retrieval of certain items 1135 having high turnover or velocity within a large physical facility, those items 1135 may be stored in several different locations to reduce congestion that might occur at a single point of storage.

When an order specifying one or more items 1135 is received, or as an agent progresses through the materials handling facility 1100, the corresponding items 1135 may be selected or "picked" from the inventory area 1130. For example, in one implementation, an agent may have a list of items to pick and may progress through the materials handling facility picking items 1135 from the inventory area 1130. In other implementations, agents may pick items 1135 using written or electronic pick lists derived from orders. In some instances, an item may need to be repositioned from one location within the inventory area 1130 to another location. For example, in some instances, an item may be picked from its inventory location, moved a distance and placed at another location.

As discussed herein, as the agent moves through the materials handling facility, images of the agent may be obtained and processed by the agent model management system to determine an agent model representative of the agent and/or to track a position of the agent as the agent moves. The agent model may be used to aid in the verification and/or re-verification of the agent within the materials handling facility.

Figure 12:
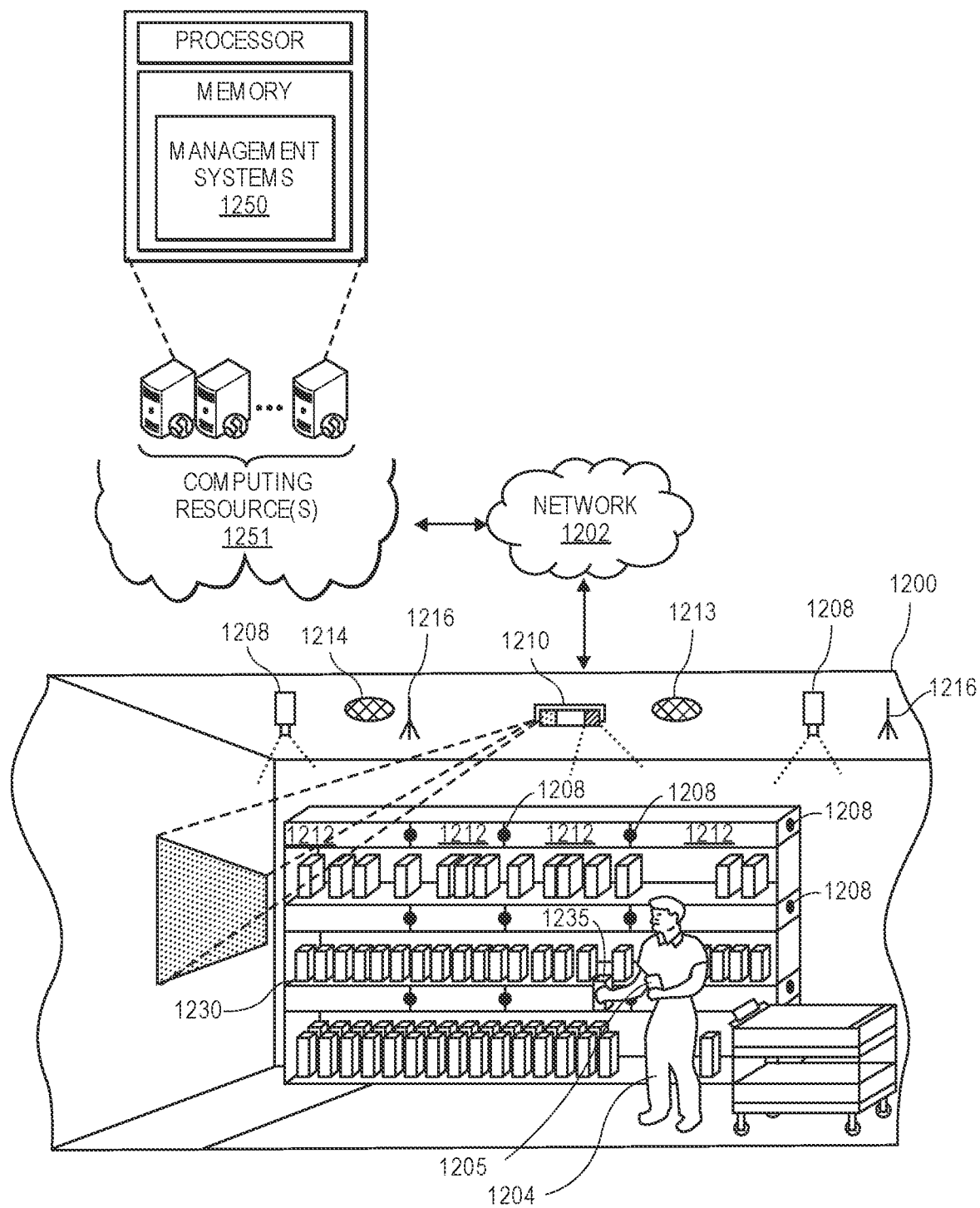
FIG. 12 shows additional components of the materials handling facility of FIG. 11, in accordance with described implementations.

FIG. 12 shows additional components of a materials handling facility 1200, in accordance with described implementations. Generally, the materials handling facility 1200 may include one or more image capture devices, such as cameras 1208. For example, one or more cameras 1208 may be positioned in locations of the materials handling facility 1200 so that images of locations, items, and/or agents within the materials handling facility can be captured. In some implementations, the image capture devices 1208 may be positioned overhead, such as on the ceiling, and oriented toward a surface (e.g., floor) of the material handling facility. The overhead image capture devices may then be used to capture images of agents and/or locations within the materials handling facility from an overhead view. In addition, in some implementations, one or more cameras 1208 may be positioned on or inside of inventory areas. For example, a series of cameras 1208 may be positioned on external portions of the inventory areas and positioned to capture images of agents and/or the location surrounding the inventory area.

Any type of camera and/or configuration of cameras may be used with the implementations described herein. For example, one or more of the cameras may be a red, green, blue ("RGB") color camera, still camera, motion capture/video camera, etc. In other implementations, one or more of the cameras may be depth sensing cameras, also referred to herein as a RGBD camera. In still other implementations, one or more of the cameras may be a thermographic or infrared (IR) camera, etc. In some implementations, the cameras may simply be camera modules that include a lens and an image sensor. The image sensor may convert an optical image obtained by the lens of the camera into a digital signal or digital representation of the image (generally referred to herein as image data). In one implementation, the image sensor may be a RGB sensor capable of supporting an image resolution of at least 860×480 at six frames per second. The image sensor may likewise be configured to provide the image data to other components (e.g., a graphics processing unit) for processing and/or other systems, such as the agent model management system 1150-2. In some implementations, cameras may be paired to provide stereo imagery and depth values indicating a distance between the camera and an object being imaged. A stereo camera may include a pair of camera modules. Image data may be stored in any variety of formats including, but not limited to, YUYV, RGB, RAW, HEX, HSV, HLS, CMYK, bmp, jpeg, etc.

Cameras operate by electronically capturing reflected light from objects and assigning quantitative values to one or more aspects of the reflected light, such as pixels. A camera may include one or more sensors having one or more filters associated therewith. The sensors of a camera may capture information regarding any number of pixels of the reflected light corresponding to one or more base colors (e.g., red, green or blue) expressed in the reflected light, and store values associated with the pixel colors as image data and/or transmit image data to another device for further analysis or reproduction. The camera may also be configured to determine depth values, such as the distance between the camera and an object in the field of view of the camera. Depth values may be included in the image data generated by the camera.

Information and/or data regarding features or objects represented in a digital image may be extracted from the image in any number of ways. For example, a color of a pixel or a group of pixels in image data may be determined and quantified according to one or more standards, e.g., the RGB color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of an image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

In addition to cameras, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, a light curtain may be virtually positioned to cover the front of an inventory area and detect when an object (e.g., an agent's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

In some implementations, an agent 1204 located in the materials handling facility 1200 may possess a portable device 1205 and obtain information about items located within the materials handling facility 1200, receive confirmation that the inventory management system has correctly identified items that are picked and/or placed by the agent, receive requests for confirmation regarding one or more event aspects, etc. Generally, the portable device has at least a wireless module to facilitate communication with the management systems 1250 (e.g., the inventory management system) and a display (e.g., a touch based display) to facilitate visible presentation to and interaction with the agent. The portable device may store a unique identifier and provide that unique identifier to the management systems 1250 and be used to identify the agent. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management systems 1250. Likewise, components of the management systems 1250 may interact and communicate with the portable device as well as identify the agent, communicate with the agent via other means and/or communicate with other components of the management systems 1250.

Generally, the management systems 1250 may include or communicate with one or more input/output devices, such as imaging devices (e.g., cameras) 1208, projectors 1210, displays 1212, speakers 1213, microphones 1214, illumination elements (e.g., lights), etc., to facilitate communication between the management systems 1250 and/or the agent and detection of items, events and/or other actions within the materials handling facility 1200. In some implementations, multiple input/output devices may be distributed within the materials handling facility 1200. For example, there may be multiple imaging devices, such as cameras located on the ceilings and/or cameras (such as pico-cameras) located in the aisles near the inventory items.

Likewise, the management systems 1250 may also include and/or interface with one or more communication devices, such as wireless antennas 1216, which facilitate wireless communication (e.g., Wi-Fi, Near Field Communication (NFC), Bluetooth) between the management systems 1250 and other components or devices. The management systems 1250 may also include one or more computing resource(s) 1251, such as a server system, that may be local to the environment (e.g., materials handling facility), remote from the environment, or any combination thereof.

The management systems 1250 may utilize antennas 1216 within the materials handling facility 1200 to create a network 1202 (e.g., Wi-Fi) so that the components and devices can connect to and communicate with the management systems 1250. For example, when the agent picks an item 1235 from an inventory area 1230, a camera of the multiple-camera apparatus 1227 may detect the removal of the item and the management systems 1250 may receive information, such as image data of the performed action (item pick from the inventory area), identifying that an item has been picked from the inventory area 1230. The event aspects (e.g., agent identity, action performed, item involved in the event) may then be determined by the management systems 1250.

Figure 13:
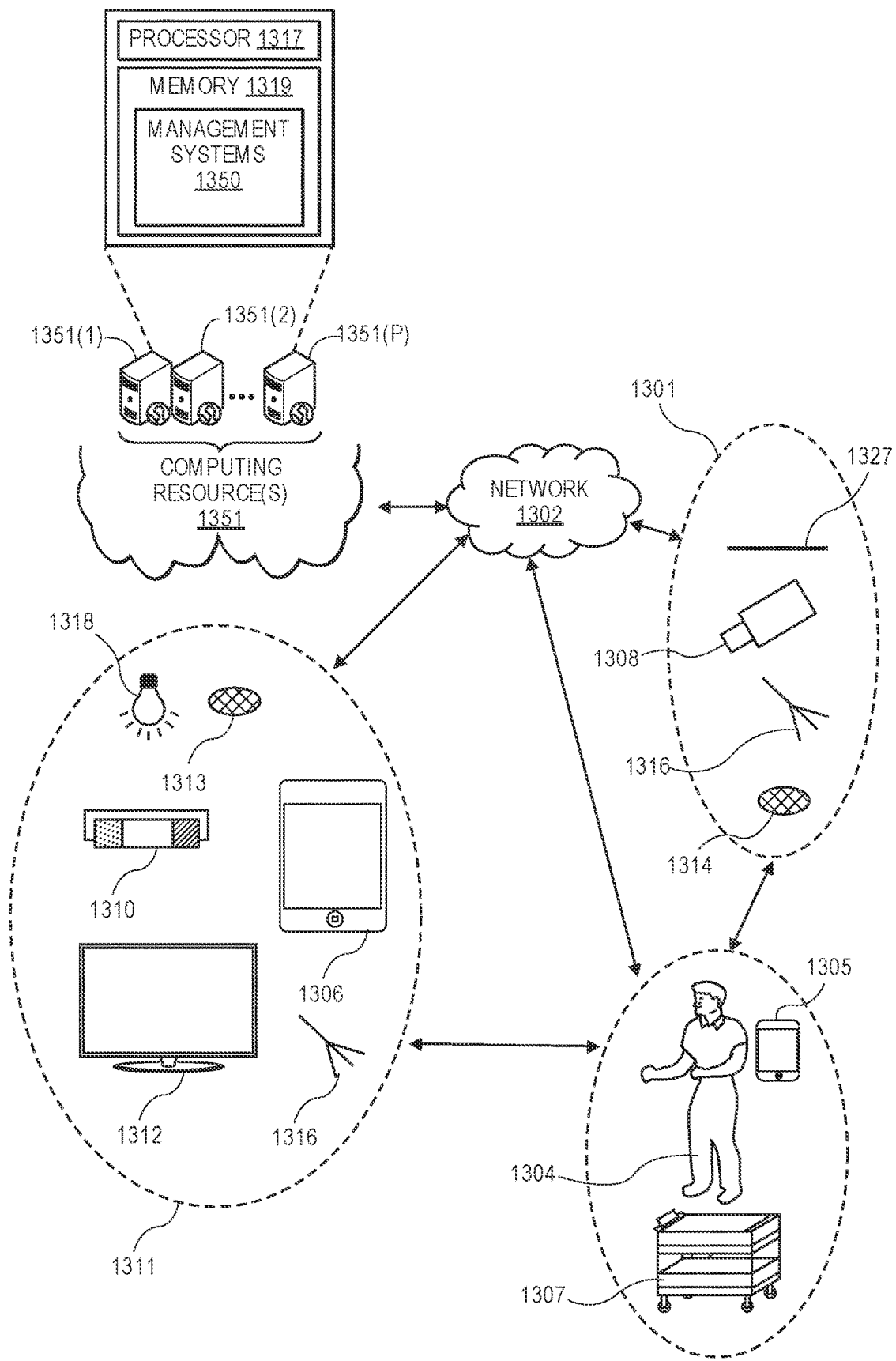
FIG. 13 shows components and communication paths between component types utilized in a materials handling facility of FIG. 11, in accordance with described implementations.

FIG. 13 shows example components and communication paths between component types utilized in a materials handling facility, in accordance with one implementation. A portable device 1305 may communicate and interact with various components of management systems 1350 over a variety of communication paths. Generally, the management systems 1350 may include or communicate with input components 1301, output components 1311 and computing resource(s) 1351. The input components 1301 may include an imaging device 1308, a multiple-camera apparatus 1327, microphone 1314, antenna 1316, or any other component that is capable of receiving input about the surrounding environment and/or from the agent. The output components 1311 may include a projector 1310, a portable device 1306, a display 1312, an antenna 1316, a radio, speakers 1313, illumination elements 1318 (e.g., lights), and/or any other component that is capable of providing output to the surrounding environment and/or the agent.

The management systems 1350 may also include or be incorporated on computing resource(s) 1351. The computing resource(s) 1351 may be local to the environment (e.g., materials handling facility), remote from the environment, or any combination thereof. Likewise, the computing resource(s) 1351 may be configured to communicate over a network 1302 with input components 1301, output components 1311 and/or directly with the portable device 1305, an agent 1304 and/or the a 1307.

As illustrated, the computing resource(s) 1351 may be remote from the environment and implemented as one or more servers 1351(1), 1351(2), . . . , 1351(P) and may, in some instances, form a portion of a network-accessible computing platform implemented as a computing infrastructure of processors, storage, software, data access, and so forth that is maintained and accessible by components/devices of the management systems 1350 and/or the portable device 1305 via a network 1302, such as an intranet (e.g., local area network), the Internet, etc. The computing resources 1351 may process images of agents to identify the agent, process images of items to identify items, determine a location of items and/or determine a position of items. The computing resource(s) 1351 does not require end-agent knowledge of the physical location and configuration of the system that delivers the services. Common expressions associated for these remote computing resource(s) 1351 include "on-demand computing," "software as a service (SaaS)," "platform computing," "network-accessible platform," "cloud services," "data centers," and so forth.

Each of the servers 1151(1)-(P) include a processor 1317 and memory 1319, which may store or otherwise have access to management systems 1350, which may include or provide image processing (e.g., for agent identification, expression identification, and/or item identification), inventory tracking, and/or location determination.

The network 1302 may utilize wired technologies (e.g., wires, USB, fiber optic cable, etc.), wireless technologies (e.g., radio frequency, infrared, NFC, cellular, satellite, Bluetooth, etc.), or other connection technologies. The network 1302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and image processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer implemented method, comprising:
    receiving first image data from at least one camera of a plurality of cameras within a materials handling facility, wherein the first image data includes a representation of at least a portion of a first agent;
    generating, based at least in part on the first image data, a first agent model corresponding to at least a portion of the first agent;
    tracking a position of an object corresponding to the first agent as the object moves around within the materials handling facility;
    during the tracking, determining that the position of the object has been dropped;
    in response to determining that the position of the object has been dropped, adding a first object identifier corresponding to the object to a drop list; and
    subsequent to adding the first object identifier to the drop list:
        determining a second agent model representative of at least a portion of a second agent;
        determining that the second agent model corresponds to the first agent model; and
        in response to determining that the second agent model corresponds to the first agent model, associating the first agent model with a second object that is being tracked, wherein the second agent model is generated based at least in part on the second object.

2. The computer implemented method of claim 1, further comprising:
    associating a second identifier corresponding to the second object with the first agent.

3. The computer implemented method of claim 1, further comprising:
    determining a first similarity score indicative of a first similarity between the second agent model and the first agent model; and
    determining that the first similarity score exceeds a threshold; and
    wherein determining that the second agent model corresponds to the first agent model is based at least in part on determining that the first similarity score exceeds the threshold.

4. The computer implemented method of claim 3, further comprising:
    determining that a difference between the first similarity score and a second similarity score indicative of a second similarity between the second agent model and a third agent model exceeds a minimum difference; and
    wherein determining that the second agent model corresponds to the first agent model is based at least in part on determining that the first similarity score exceeds the threshold.

5. The computer implemented method of claim 1, further comprising:

updating a first item list associated with at least one of the object, the first agent, or the first agent model to include an item identifier of an item picked by the first agent; and
    in response to determining that the second agent model corresponds to the first agent model, updating a second item list associated with at least one of the second object, the second agent model, or a second agent, to include the item identifier.

6. A computing system, comprising:
    one or more processors; and
    a memory coupled to the one or more processors and storing program instructions that, when executed by the one or more processors, cause the one or more processors to at least:
        generate a first agent model corresponding to at least a portion of a first agent;
        track a position of an object corresponding to the first agent as the object moves around within a materials handling facility;
        during the tracking, determine that the position of the object has been dropped;
        in response to determination that the position of the object has been dropped, add a first object identifier corresponding to the object to a drop list; and
        subsequent to addition of the first object identifier to the drop list:
            determine a second agent model representative of at least a portion of a second agent;
            determine that the second agent model corresponds to the first agent model; and
            in response to determination that the second agent model corresponds to the first agent model, associate the first agent model with a second object that is being tracked, wherein the second agent model is generated based at least in part on the second object.

7. The computing system of claim 6, wherein the program instructions further include program instructions that, when executed by the one or more processors, further cause the one or more processors to at least:
    receive first image data from at least one camera of a plurality of cameras within the materials handling facility, wherein the first image data includes a representation of at least a portion of the first agent; and
    generate, based at least in part on the first image data, the first agent model.

8. The computing system of claim 6, wherein the program instructions further include program instructions that, when executed by the one or more processors, further cause the one or more processors to at least:
    determine, based at least in part on a first image data that includes a representation of at least a portion of the first agent, a first agent height value for the first agent; and
    wherein the first agent model includes the first agent height value.

9. The computing system of claim 8, wherein the program instructions further include program instructions that, when executed by the one or more processors, further cause the one or more processors to at least:
    determine, based at least in part on a second image data, a second agent height value for the second agent; and
    wherein the determination that the second agent model corresponds to the first agent model is based at least in part on a comparison of the first agent height value with the second agent height value.

10. The computing system of claim 6, wherein the program instructions further include program instructions that, when executed by the one or more processors, further cause the one or more processors to at least:
  determine a first similarity score indicative of a first similarity between the second agent model and the first agent model; and
  determine that the first similarity score exceeds a threshold; and
  wherein determination that the second agent model corresponds to the first agent model is based at least in part on a determination that the first similarity score exceeds the threshold.

11. The computing system of claim 10, wherein the program instructions further include program instructions that, when executed by the one or more processors, further cause the one or more processors to at least:
  determine that a difference between the first similarity score and a second similarity score indicative of a second similarity between the second agent model and a third agent model exceeds a minimum difference; and
  wherein determination that the second agent model corresponds to the first agent model is based at least in part on a determination that the first similarity score exceeds the threshold.

12. The computing system of claim 6, wherein the program instructions further include program instructions that, when executed by the one or more processors, further cause the one or more processors to at least:
  update a first item list associated with at least one of the object, the first agent, or the first agent model, to include an item identifier of an item picked by the first agent; and
  in response to determination that the second agent model corresponds to the first agent model, update a second item list associated with at least one of the second object, the second agent model, or a second agent, to include the item identifier.

13. The computing system of claim 6, wherein the program instructions further include program instructions that, when executed by the one or more processors, further cause the one or more processors to at least:
  receive image data from one or more image capture devices located within the materials handling facility; and
  generate, based at least in part on the image data, a first plurality of feature vectors representative of at least a portion of the first agent represented in at least a portion of the image data, wherein the first plurality of feature vectors are included in the first agent model.

14. The computing system of claim 13, wherein the first plurality of feature vectors include two or more of:
  a first face feature vector representative of facial features of the first agent;
  a first torso feature vector representative of an appearance of a torso of the first agent;
  a first head feature vector representative of an appearance of a head of the first agent;
  a first lower body feature vector representative of an appearance of a lower body of the first agent;
  a first foot feature vector representative of an appearance of a foot or feet of the first agent; or
  a first whole-body feature vector representative of an appearance of a whole body of the first agent.

15. A method, comprising:
  receiving image data from one or more image capture devices located within a materials handling facility;
  generating, based at least in part on the image data, a first agent model that includes a first plurality of feature vectors representative of a first agent represented in at least a portion of the image data;
  subsequent to generating the first agent model, determining that a position of the first agent has been dropped;
  in response to determining that the position of the first agent has been dropped, adding a first identifier corresponding to the first agent model to a drop list;
  subsequent to adding the first identifier to the drop list:
    determining a second agent model representative of at least a portion of a second agent;
    determining that the second agent model corresponds to the first agent model; and
    in response to determining that the second agent model corresponds to the first agent model, associating the first agent model with a second agent model; and
  updating an item list corresponding to the second agent model to include an item identifier of an item picked by the first agent.

16. The method of claim 15, further comprising:
  determining a first similarity score indicative of a first similarity between the second agent model and the first agent model; and
  determining that the first similarity score exceeds a threshold; and
  wherein determining that the second agent model corresponds to the first agent model is based at least in part on determining that the first similarity score exceeds the threshold.

17. The method of claim 16, further comprising:
  determining that a difference between the first similarity score and a second similarity score indicative of a second similarity between the second agent model and a third agent model exceeds a minimum difference; and
  wherein determining that the second agent model corresponds to the first agent model is based at least in part on determining that the first similarity score exceeds the threshold.

18. The method of claim 15, further comprising:
  updating a first item list associated with at least one of the first agent or the first agent model to include an item identifier of an item picked by the first agent; and
  in response to determining that the second agent model corresponds to the first agent model, updating a second item list associated with at least one of the second agent model or a second agent to include the item identifier.

19. The method of claim 15, further comprising:
  determining the drop list indicating at least one dropped agent model for which tracking has become unavailable; and
  wherein determining that the second agent model corresponds to the first agent model includes:
    comparing the second agent model with each agent model indicated on the drop list; and
    determining, based at least in part on the comparing, that the first agent model has a highest similarity among each of the agent models indicated in the drop list with the second agent model.

20. The method of claim 15, wherein the second agent model and the first agent model both represent the first agent.

* * * * *